(12) United States Patent
Echemendia

(10) Patent No.: US 7,956,486 B2
(45) Date of Patent: Jun. 7, 2011

(54) WINDMILL ELECTRIC GENERATOR FOR HYDROELECTRIC POWER SYSTEM

(76) Inventor: Abel Echemendia, Palm Springs, FL (US)

(*) Notice: Subject to any disclaimer, the term of this patent is extended or adjusted under 35 U.S.C. 154(b) by 233 days.

(21) Appl. No.: 12/484,698

(22) Filed: Jun. 15, 2009

(65) Prior Publication Data
US 2011/0109092 A1 May 12, 2011

Related U.S. Application Data

(63) Continuation-in-part of application No. 12/471,353, filed on May 23, 2009.

(51) Int. Cl.
*F03D 9/00* (2006.01)
*H02P 9/04* (2006.01)

(52) U.S. Cl. ........ 290/55; 290/44; 310/154.34; 310/209

(58) Field of Classification Search .............. 290/44, 290/55; 416/95, 97 R, 232, 223 R, 132 B; 60/398; 415/2.1, 4.2, 4.5, 907; 310/209, 310/154.34
See application file for complete search history.

(56) References Cited

U.S. PATENT DOCUMENTS

| | | | | |
|---|---|---|---|---|
| 1,071,748 A | | 9/1913 | Ingison | |
| 2,610,993 A | * | 9/1952 | Stark | 310/154.34 |
| 3,011,762 A | * | 12/1961 | Pouit | 415/109 |
| 3,246,469 A | * | 4/1966 | Moore | 60/265 |
| 3,378,228 A | * | 4/1968 | Davies et al. | 416/95 |
| 3,767,322 A | * | 10/1973 | Durgin et al. | 416/97 R |
| 3,989,412 A | * | 11/1976 | Mukherjee | 416/97 R |
| 4,221,539 A | * | 9/1980 | Corrigan | 416/97 A |
| 4,335,996 A | * | 6/1982 | Ross | 416/88 |
| 5,348,446 A | * | 9/1994 | Lee et al. | 416/241 R |
| 5,667,359 A | * | 9/1997 | Huber et al. | 416/96 A |
| 5,886,442 A | * | 3/1999 | Ogino et al. | 310/181 |
| 6,254,345 B1 | | 7/2001 | Harris et al. | |
| 6,916,150 B2 | * | 7/2005 | Liang | 415/115 |
| 6,946,750 B2 | * | 9/2005 | Wobben | 290/44 |
| 6,951,443 B1 | * | 10/2005 | Blakemore | 415/4.3 |
| 7,210,896 B2 | * | 5/2007 | Knott | 415/4.3 |
| 7,247,003 B2 | * | 7/2007 | Burke et al. | 416/229 R |
| 7,819,629 B2 | * | 10/2010 | Liang | 416/97 R |
| 2009/0104028 A1 | * | 4/2009 | Trewin et al. | 415/176 |
| 2009/0324383 A1 | * | 12/2009 | Mazur | 415/4.2 |
| 2010/0158694 A1 | * | 6/2010 | Stam et al. | 416/230 |

* cited by examiner

*Primary Examiner* — Julio Cesar Gonzalez
(74) *Attorney, Agent, or Firm* — Donald J. Ersler

(57) ABSTRACT

A windmill electric generator includes a support base, an inline generator assembly, a large generator, a variable blade pitch housing and a plurality of blades. The support base includes a pedestal support and a rotating support. The inline generator assembly includes a generator support structure, a plurality of inline generators and a drive shaft. The generator support structure is attached to a top of the rotating support. Large generator support members are attached to the generator support structure. The variable blade pitch housing is attached to one end of the drive shaft. The plurality of blades are pivotally retained on the variable blade pitch housing. The large generator includes a rotor and a stator assembly. The rotor is retained on the other end of the drive shaft. The stator assembly is attached to an end of the plurality of large generator support members.

19 Claims, 24 Drawing Sheets

US 7,956,486 B2

WINDMILL ELECTRIC GENERATOR FOR HYDROELECTRIC POWER SYSTEM

CROSS-REFERENCES TO RELATED APPLICATIONS

This is a continuation-in-part patent application taking priority from nonprovisional application Ser. No. 12/471,353 filed on May 23, 2009.

BACKGROUND OF THE INVENTION

1. Field of the Invention

The present invention relates generally to hydroelectric power generation and more specifically to a windmill electric generator for a hydroelectric power system, which provides electric power to a hydroelectric power system or electric power to any electrical load.

2. Discussion of the Prior Art

U.S. Pat. No. 4,443,707 to Scieri et al. discloses a hydro electric generating system. The Scieri et al. patent includes a system to produce power by changing the potential energy of water to kinetic energy to drive a turbine, which is coaxially connected to a generator. U.S. Pat. No. 4,698,516 to Thompson discloses a hydro-electric power plant. The Thompson patent includes a power plant specifically structured to operate in connection with a water reservoir supplied from a natural body of water such as an ocean, lake, etc. and which is structured to be at least partially self-sufficient.

U.S. Pat. No. 6,836,028 to Northrup et al. discloses a segmented arc generator. The Northrup et al. patent includes a rotor having a plurality of salient poles disposed about a periphery of a rotor ring. A switching matrix selectively places the coils in series or parallel or a combination of series and parallel connections with respect to one another in response to control signals that are based on present operating conditions of the generator.

U.S. Pat. No. 1,071,748 to Ingison discloses a current motor. The Ingison patent includes a current motor which may be readily coupled with companion motors into longitudinally or traversely disposed lines or gangs. U.S. Pa. No. 6,254,345 to Harris et al. discloses an internally cooled blade tip shroud. The Harris et al. patent includes a gas turbine engine turbine blade shrouded tip having an airfoil tip with a cross-sectional airfoil shape, a blade tip shroud attached to the tip, and a shroud cooling circuit disposed within the blade tip shroud.

Accordingly, there is a clearly felt need in the art for a windmill electric generator for a hydroelectric power system, which includes water stored in the blades of the windmill, a plurality of generators in series and a large generator with individually actuated stators.

SUMMARY OF THE INVENTION

The present invention provides a windmill electric generator for a hydroelectric power system, which provides electric power to a hydroelectric power system or electric power to any electrical load. The hydroelectric power system includes a plurality of paddle wheels, a plurality of electrical generators a pumping system and a support structure. The support structure includes at least one water channel, a water reservoir and a support base. The support base is located in or above a body of water either natural or man made. The support base includes an inclined surface. The at least one water channel is formed in the inclined surface. The water reservoir is located on a top of the inclined surface. The natural body of water could be a pond, river, lake or ocean. The man made body of water could be a holding tank or a ground reservoir. The pumping system includes a plurality of inlet pipes and water pumps. One end of each inlet pipe is located in the body of water and the other end fills the water reservoir with water.

The plurality of paddle wheels are rotatably retained along a length of the inclined surface. Each paddle wheel includes a plurality of paddles extending radially from a paddle hub. A paddle axle is inserted through the paddle hub. Some of the paddles are tank paddles that include a hollow space. Preferably, one half of the hollow space is filled with water and the other half is filled with compressed air. The paddle axle drives at least one electrical generator. Each electrical generator includes a plurality of stator sections. The plurality of stator sections are retained on the support structure. Each stator may be engaged or disengaged through a control device.

Water is pumped from the body of water with the plurality of water pumps through the plurality of inlet pipes up to the water reservoir. The water in the water reservoir flows down the water channel and causes the plurality of paddle wheels to rotate. The rotating paddle wheels cause the plurality of electrical generators to rotate and generate electricity. The plurality of water pumps may be driven by a wind mill or any other suitable source. Some of the plurality of water pumps may also be driven by a bottom paddle wheel. The tank paddles in each paddle wheel act as a flywheel and increase the torque of each paddle wheel. The individually engagable stators allow the power generation to be varied for a particular application.

A windmill electric generator preferably includes a support base, an inline generator assembly a large generator, a variable blade pitch housing and a plurality of blades. The support base includes a pedestal support and a rotating support. The rotating support rotates relative to the pedestal support through at least one drive motor. The inline generator assembly includes a generator support structure, a plurality of inline generators and a drive shaft. The generator support structure includes a plurality of support rings and a plurality of support rods. The plurality of support rings are retained on the plurality of support rods to form the generator support structure. A bottom of the plurality of support rings are attached to a top of the rotating support.

Each inline generator includes a plurality of tubular rotors, a plurality of stator sections and a plurality stator retracting frames. Each stator retracting frame is retained between two adjacent support rings. Each stator retracting frame preferably includes at least two stator frame sections and a plurality of actuators. The plurality of actuators are retained in the stator frame sections. An actuating rod of each actuator is attached to one of the four stator sections. The plurality of actuators are capable of retracting the four stator sections from electrical engagement with the tubular rotors.

A plurality of large generator support members are attached to the plurality of support rings. The drive shaft is rotatably supported by the plurality of support rings. The variable blade pitch housing is attached to one end of the drive shaft. The plurality of blades are pivotally retained on the variable blade pitch housing. The large generator includes a rotor assembly and a stator assembly. The rotor assembly includes a rotor, a rotor hub and a plurality of rotor support spokes. The rotor hub is retained on the other end of the drive shaft. One end of the plurality of rotor support spokes extend from the rotor hub and the rotor is attached to the other end of the plurality of rotor support spokes.

The stator assembly includes a plurality of stator sections, stator support frame and a plurality of stator actuators. The stator support frame is attached to an end of the plurality of large generator support members. The plurality of stator actuators are retained by the stator support frame. The plurality of stator sections extend from the plurality of stator actuators.

Accordingly, it is an object of the present invention to provide a windmill electric generator for a hydroelectric power system, which includes a fluid such as water stored in the blades of the windmill.

It is a further object of the present invention to provide a windmill electric generator for a hydroelectric power system, which includes a plurality of generators in series.

It is finally an object of the present invention to provide a windmill electric generator for a hydroelectric power system, which includes a large generator with individually controlled stators.

These and additional objects, advantages, features and benefits of the present invention will become apparent from the following specification.

DETAILED DESCRIPTION OF THE PREFERRED EMBODIMENTS

Figure 1:
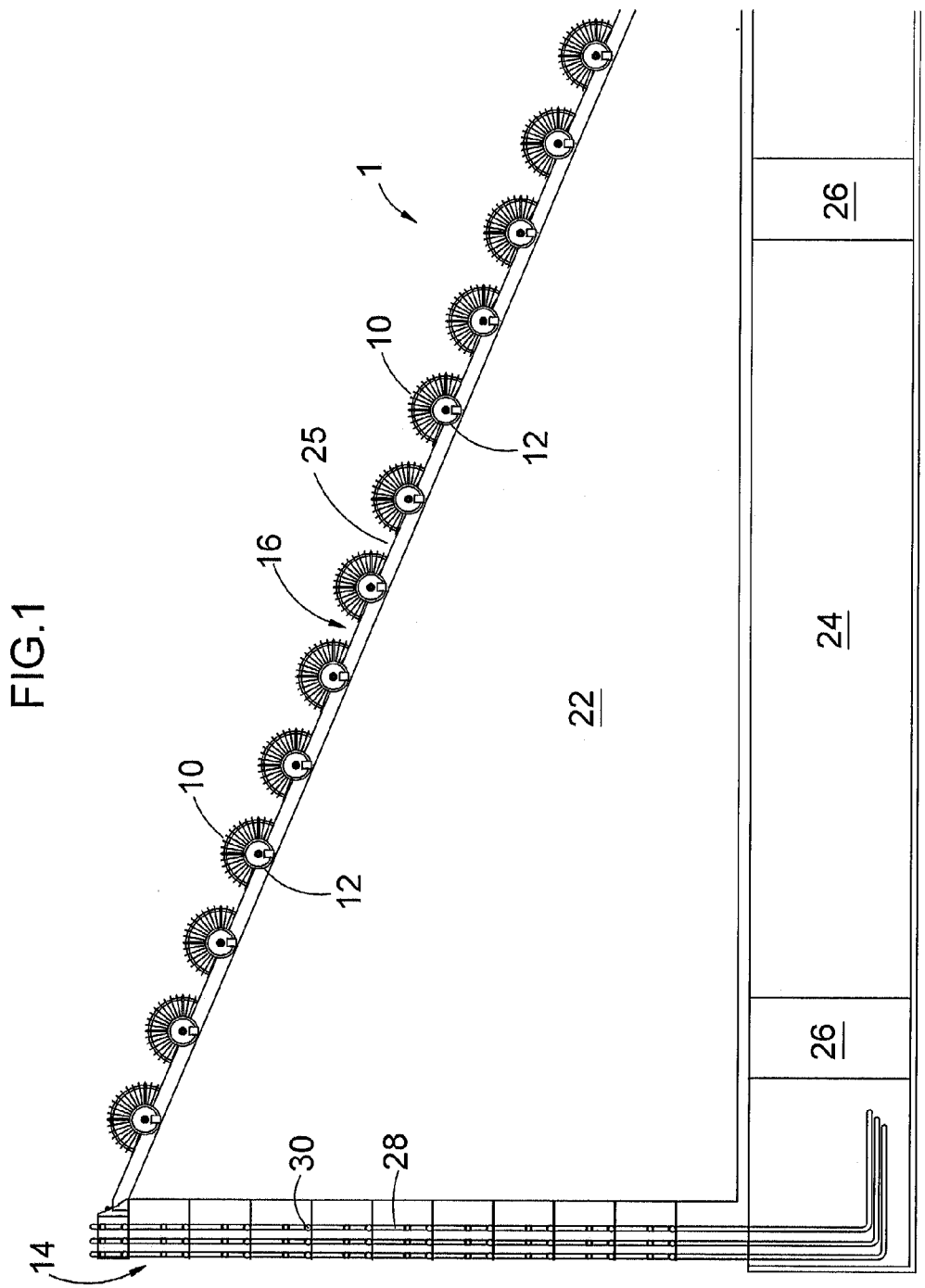
FIG. 1 is a side view of a hydroelectric power system in accordance with the present invention.
Figure 2:
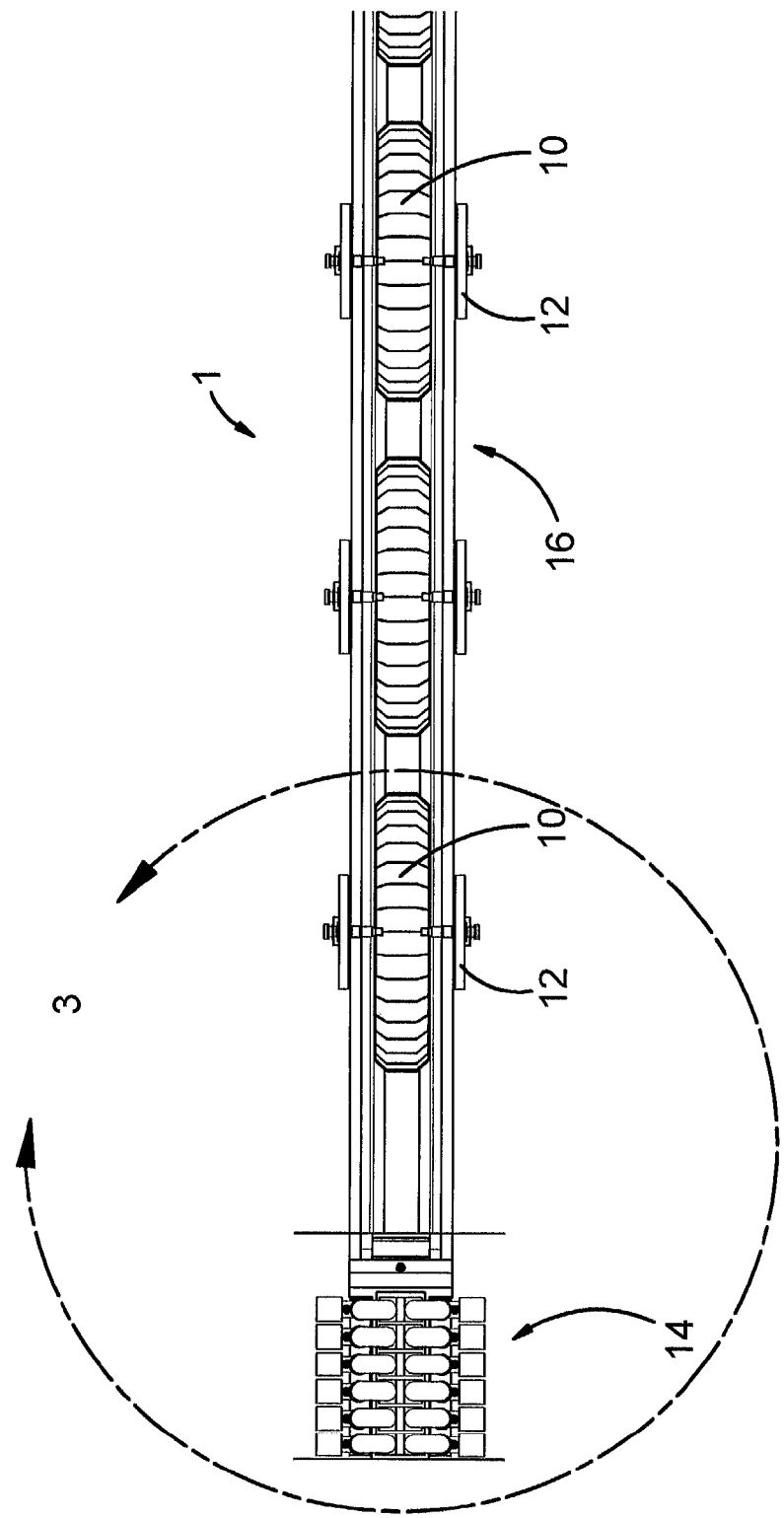
FIG. 2 is a top view of a portion of a hydroelectric power system in accordance with the present invention.
Figure 3:
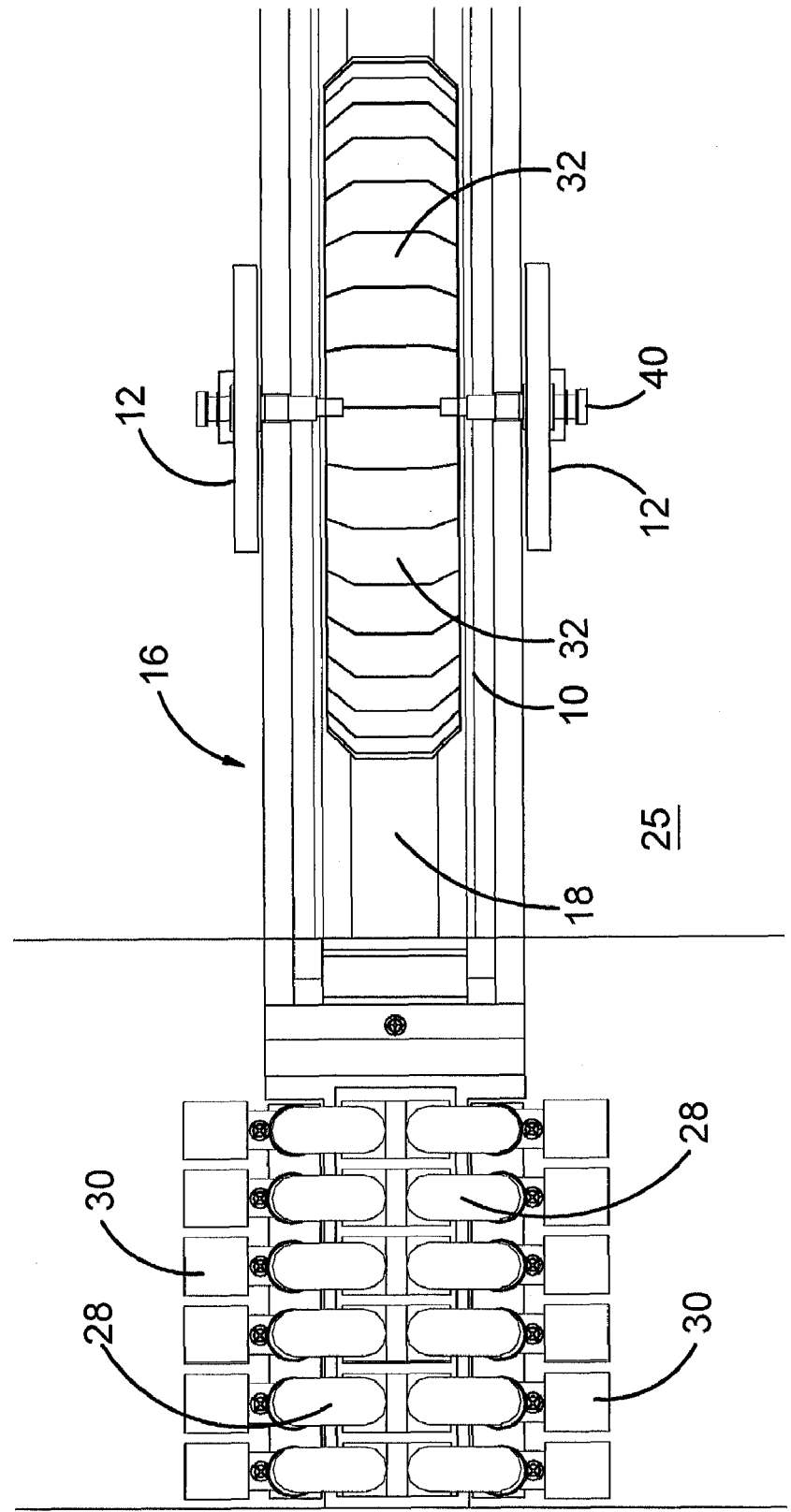
FIG. 3 is an enlarged section of a top view cut through FIG. 2 of a hydroelectric power system in accordance with the present invention.
Figure 4:
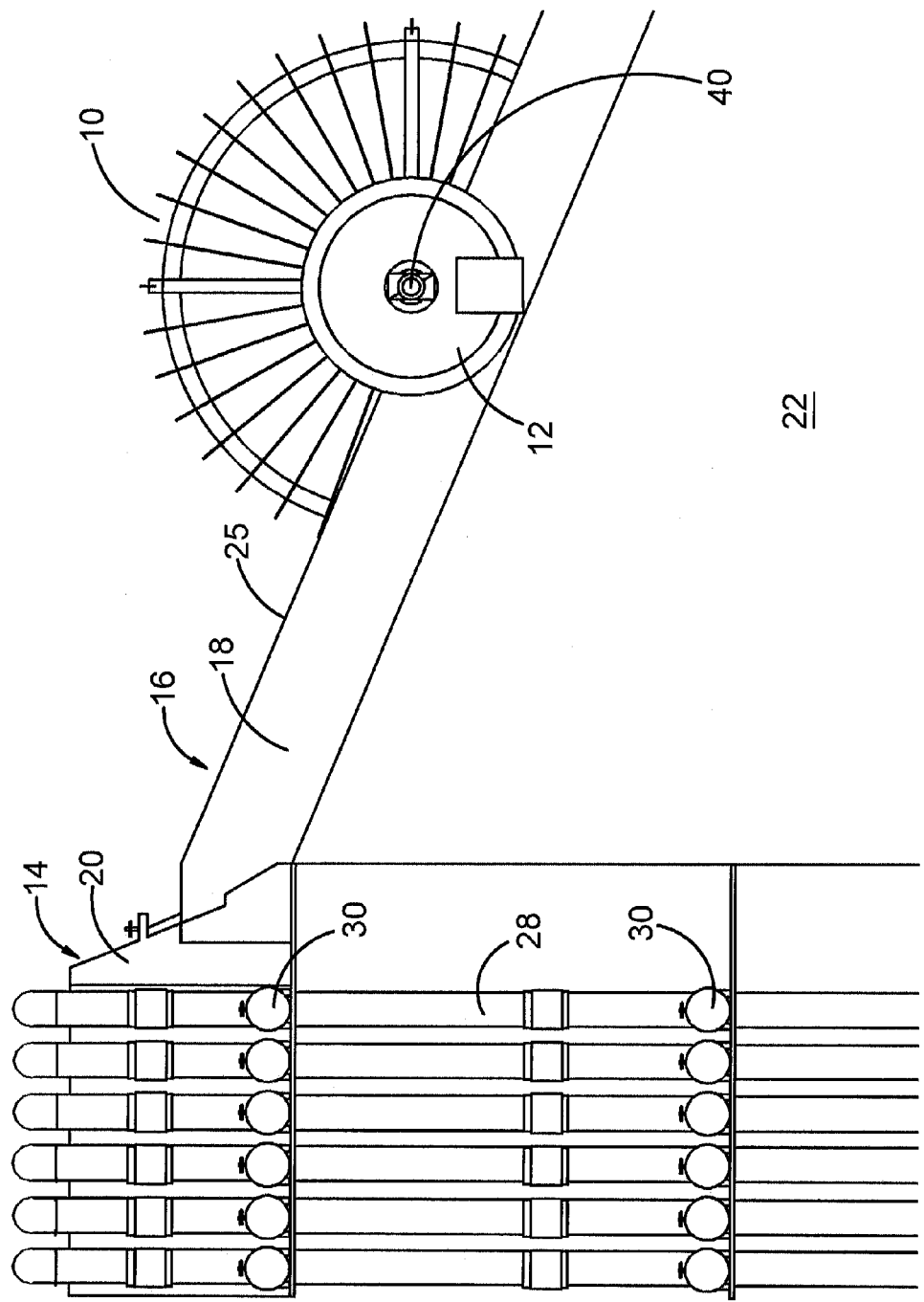
FIG. 4 is an enlarged side view of a portion of a hydroelectric power system in accordance with the present invention.
Figure 5:
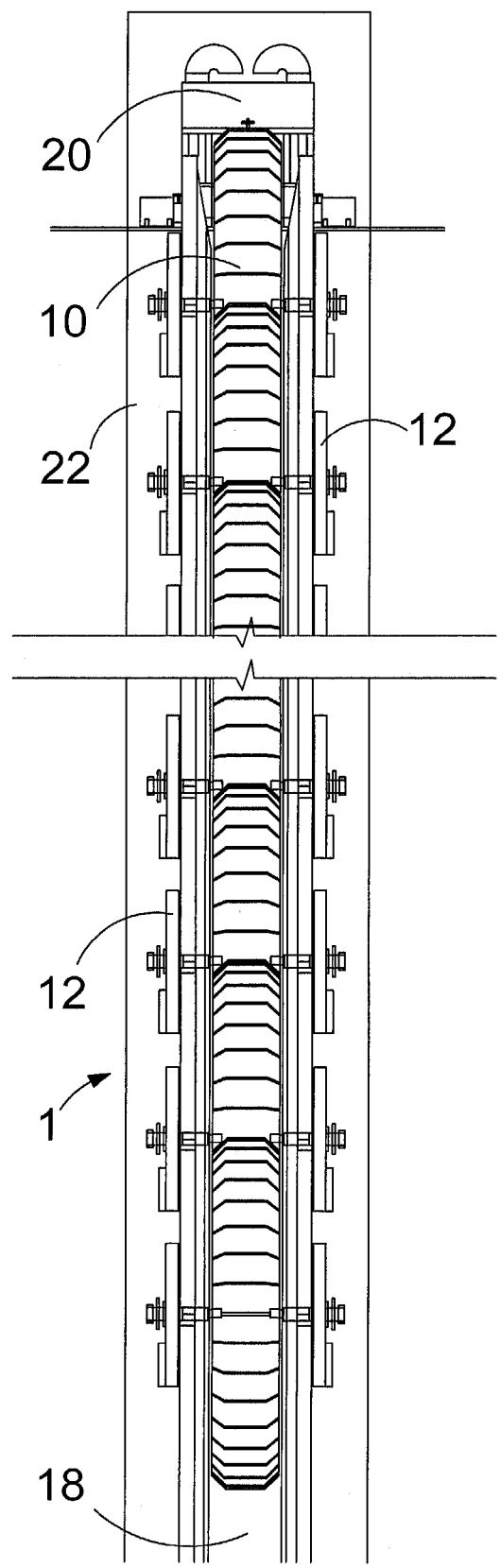
FIG. 5 is a front view of a portion of a hydroelectric power system in accordance with the present invention.
Figure 6:
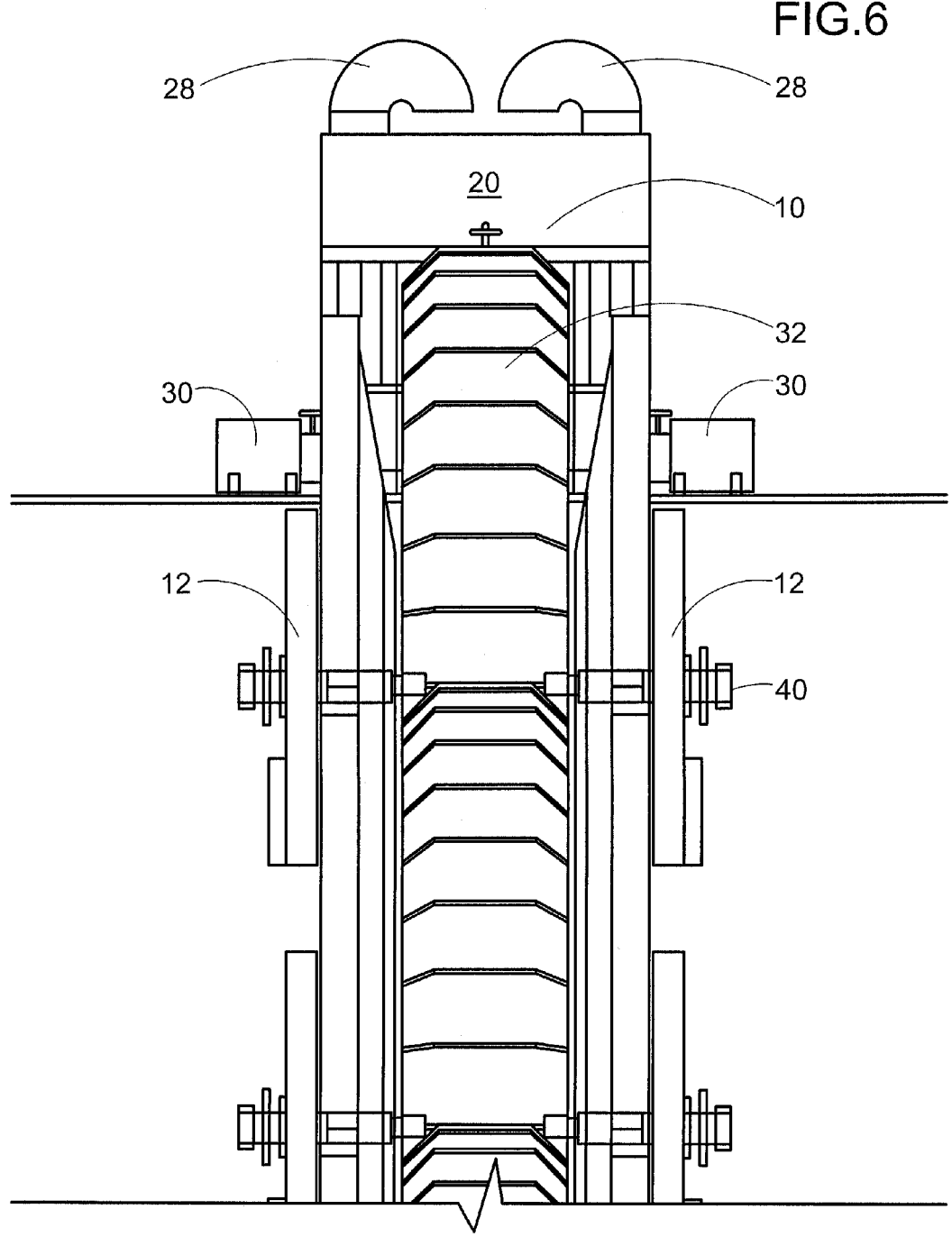
FIG. 6 is an enlarged front view of a portion of a hydroelectric power system in accordance with the present invention.

With reference now to the drawings, and particularly to FIG. 1, there is shown a side view of a hydroelectric power system 1. With reference to FIGS. 2-6, the hydroelectric power system 1 includes a plurality of paddle wheels 10, a plurality of electrical generators 12, a pumping system 14 and a support structure 16. The support structure 16 includes at least one water channel 18, a water reservoir 20 and a support base 22. The support base 22 is located in or above a body of water 24 either natural or man made. The support base 22 may be supported above the body of water with a plurality of support devices 26. The support base 22 includes an inclined surface 25. The at least one water channel 18 is formed in the inclined surface 25. The natural body of water could be a pond, river, lake or ocean. The man made body of water could be a holding tank or a ground reservoir. The pumping system 14 includes a plurality of inlet pipes 28 and water pumps 30. One end of each inlet pipe 28 is located in the body of water 24 and the other end fills the water reservoir 20 with water. The plurality of paddle wheels 10 are rotatably retained along a length of the inclined surface 18.

Figure 7:
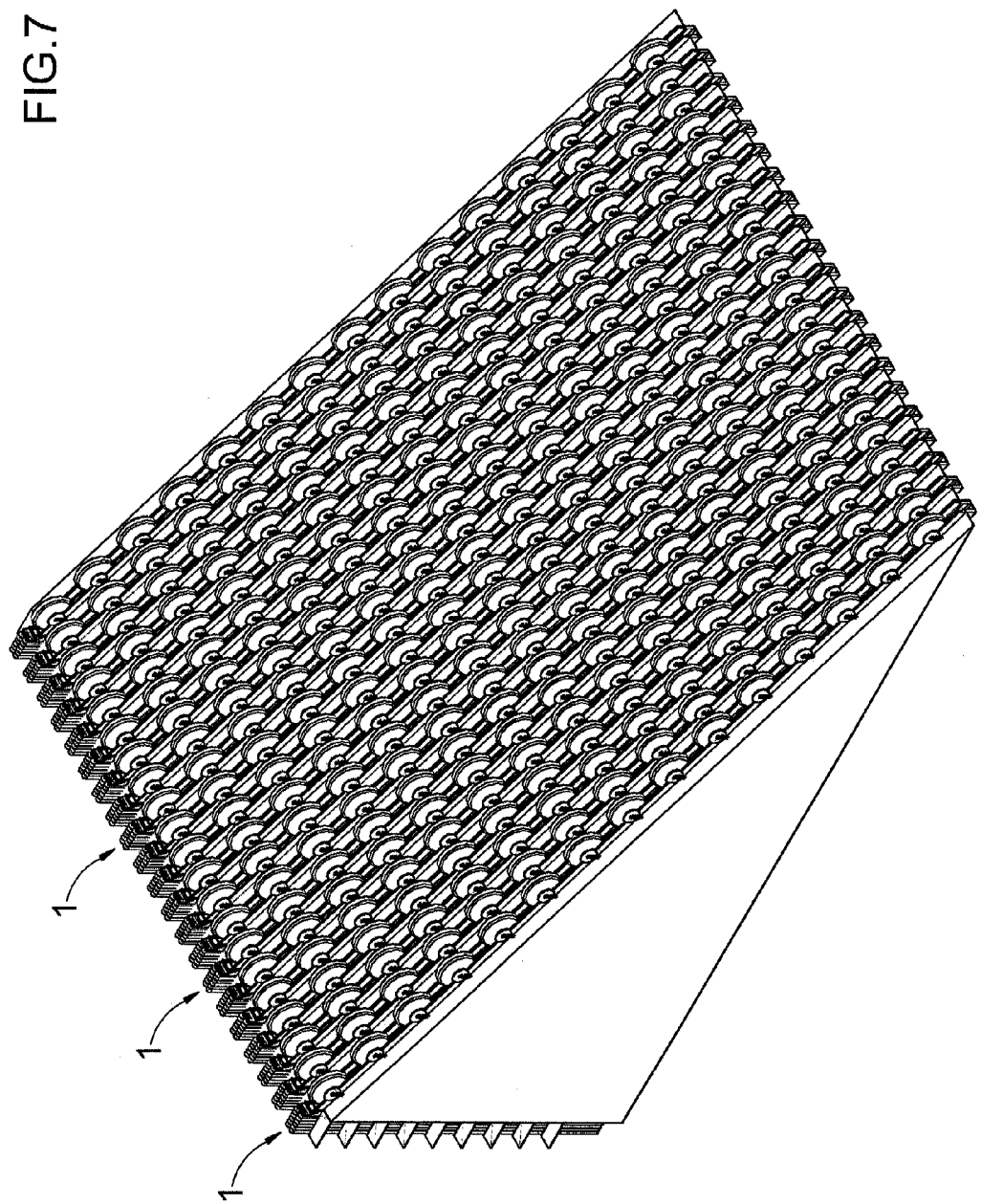
FIG. 7 is a perspective view of a hydroelectric power system with a plurality of parallel paddle wheels in accordance with the present invention.
Figure 8:
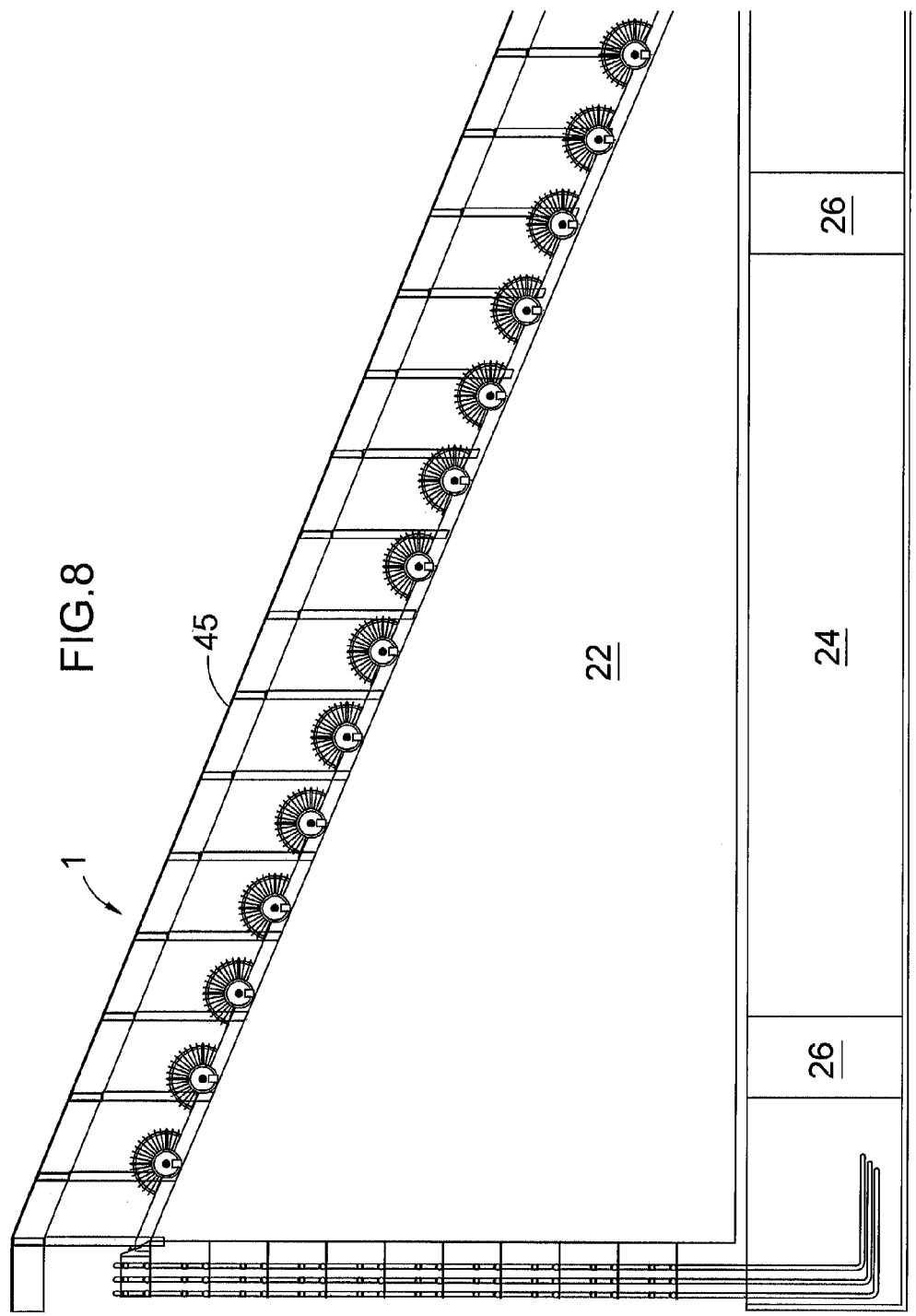
FIG. 8 is a side view of a hydroelectric power system with a roof over a plurality of paddle wheels in accordance with the present invention.
Figure 13:
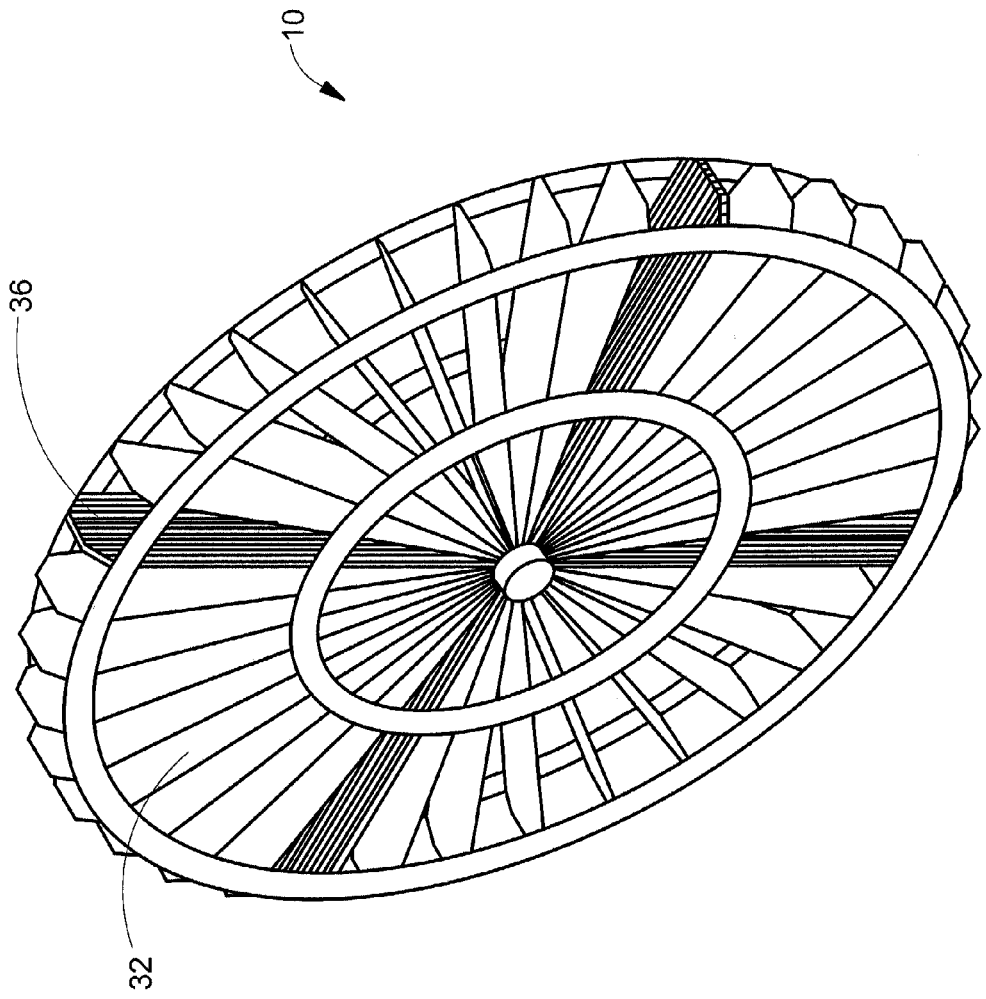
FIG. 13 is an enlarged perspective view of a paddle wheel with four tank paddles of a hydroelectric power system in accordance with the present invention.
Figure 14:
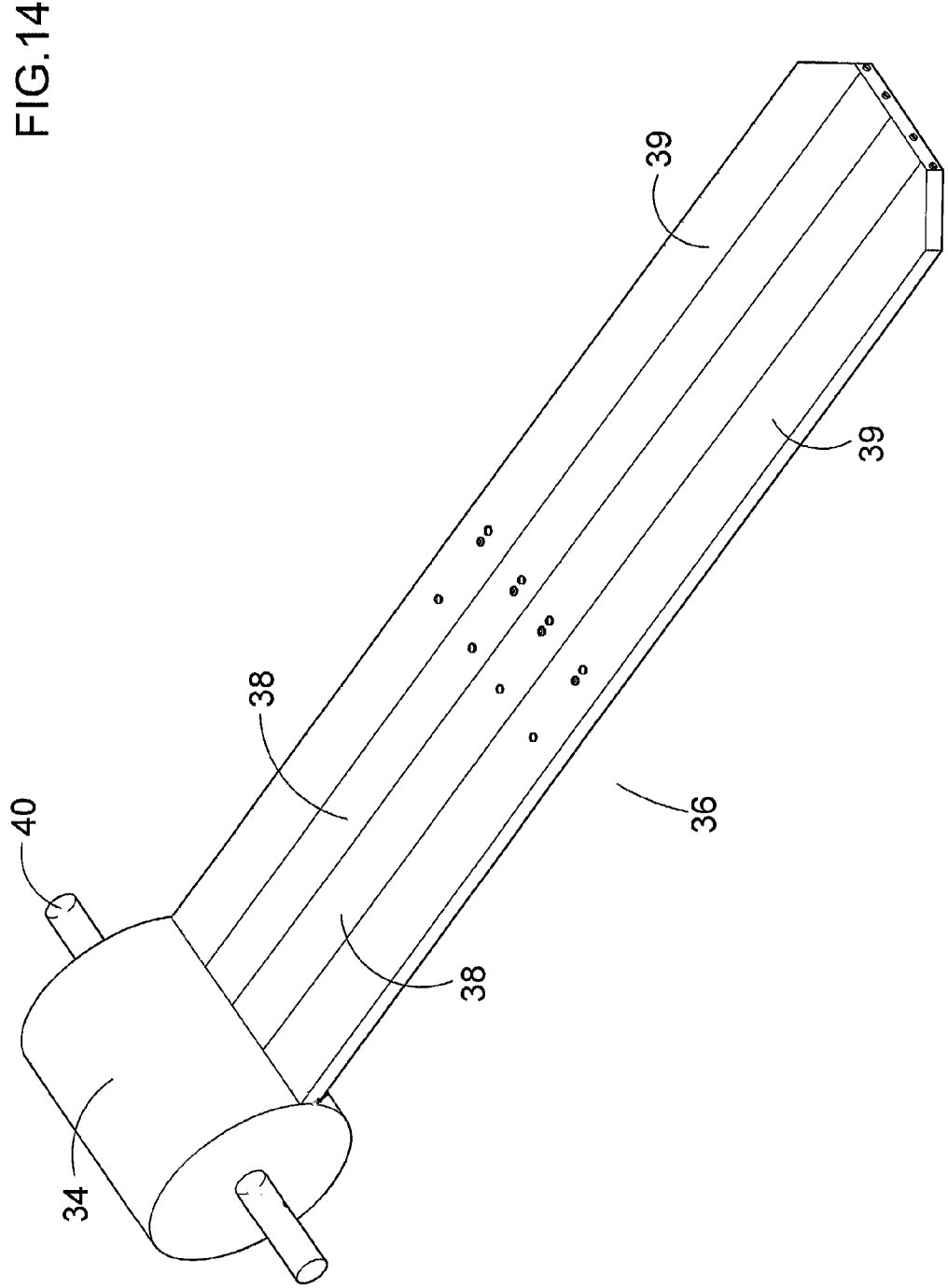
FIG. 14 is an enlarged perspective view of a tank paddle of a paddle wheel of a hydroelectric power system in accordance with the present invention.

With reference to FIGS. 13-14, each paddle wheel 10 includes a plurality of paddles 32, 36 extending radially from a paddle hub 34. Each tank paddle 36 includes a plurality of water tanks 38, 39. The plurality of water tanks 38, 39 are attached to each other. Preferably, one half of each water tank 38, 39 is filled with water and the other half is filled with compressed air. An end portion of the water tanks are filled with water. A paddle axle 40 extends from the paddle hub 34. The paddle axle 40 is rotatably retained on each end by the support base 22. With reference to FIG. 7, a plurality of hydroelectric power systems 1 are arranged in parallel. With reference to FIG. 8, a roof 45 is retained over the hydroelectric power system 1.

Figure 11:
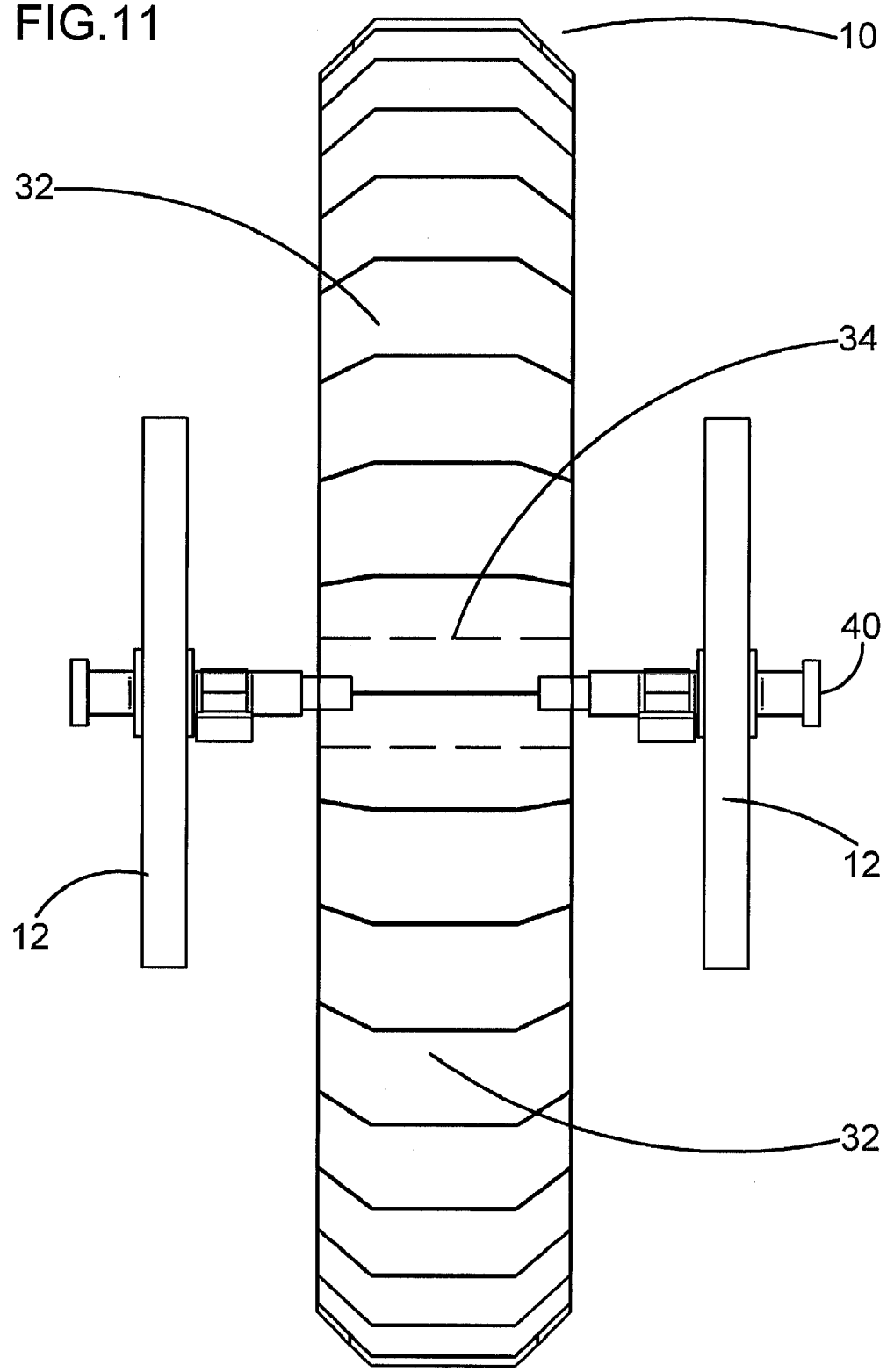
FIG. 11 is an enlarged front view of a paddle wheel with two electrical generators retained on a paddle axle thereof of a hydroelectric power system in accordance with the present invention.
Figure 12:
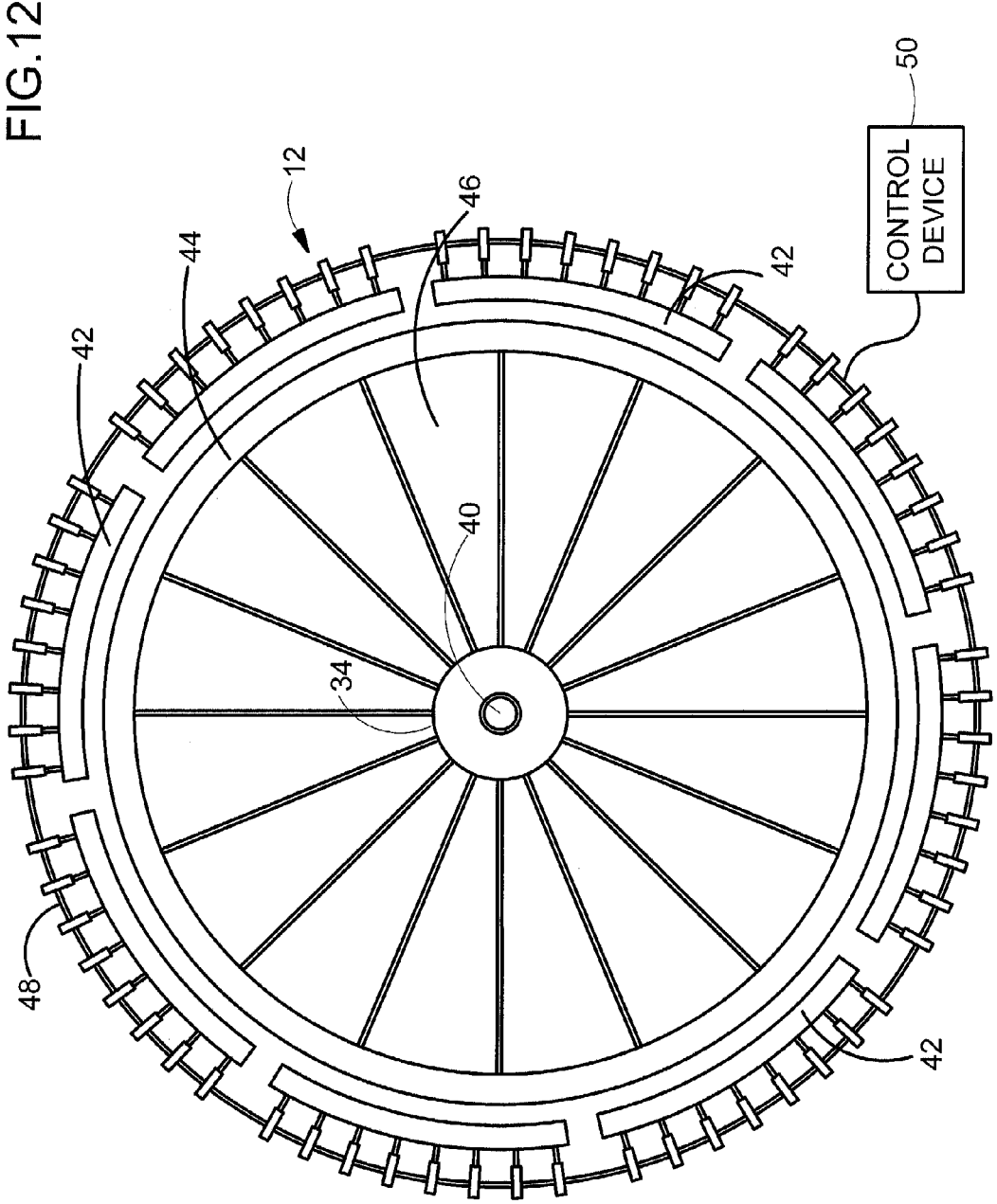
FIG. 12 is an enlarged side view of an electrical generator retained on a paddle axle of a paddle wheel of a hydroelectric power system in accordance with the present invention.

With reference to FIG. 11, the paddle axle 40 of each paddle wheel 10 drives at least one electrical generator 12. With reference to FIG. 12, each electrical generator 12 includes a plurality of stator sections 42, a rotor 44, a rotor support structure 46 and a stator support structure 48. The rotor 44 is retained on the rotor support structure 46 and the rotor support structure 46 is attached to the paddle axle 40. The plurality of stator sections 42 are retained by the stator support structure 48 and the stator support structure 48 is secured to each side of the support base 22. Each one of the plurality of stator sections 42 is engaged or disengaged through a control device 50. The control device 50 is preferably a microprocessor or microcontroller based control device.

Water is pumped from the body of water 24 with the plurality of water pumps 30 through the plurality of inlet pipes 28 up to the water reservoir 20. The water in the water reservoir 20 flows down the water channel 18 and causes the plurality of paddle wheels 12 to rotate. The rotating paddle wheels 10 cause the plurality of electrical generators 12 to rotate and generate electricity. The plurality of water pumps may be driven by a wind mill or any other suitable source.

Figure 9:
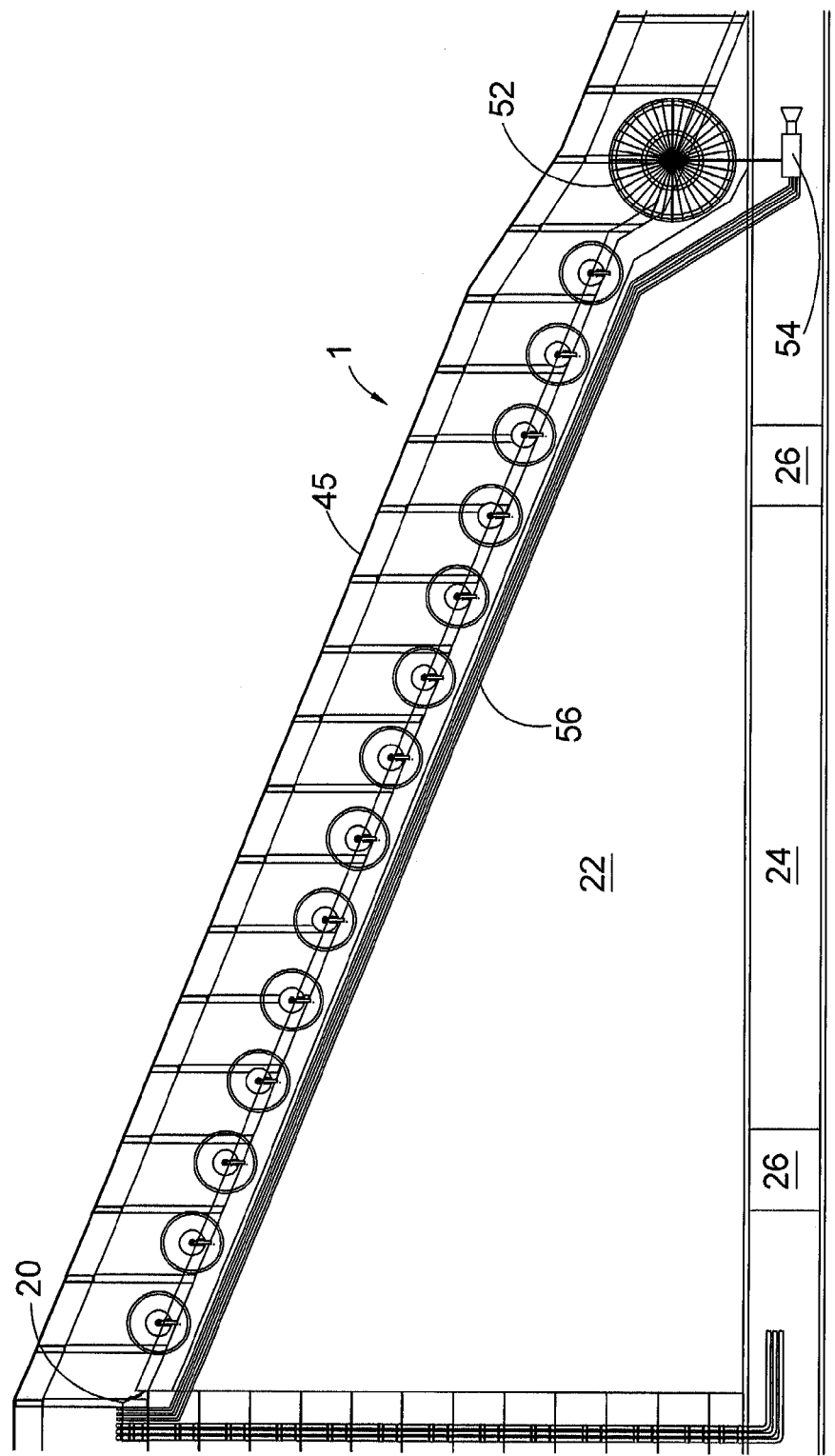
FIG. 9 is a side view of a hydroelectric power system with a bottom paddle wheel that powers at least one water pump in accordance with the present invention.
Figure 10:
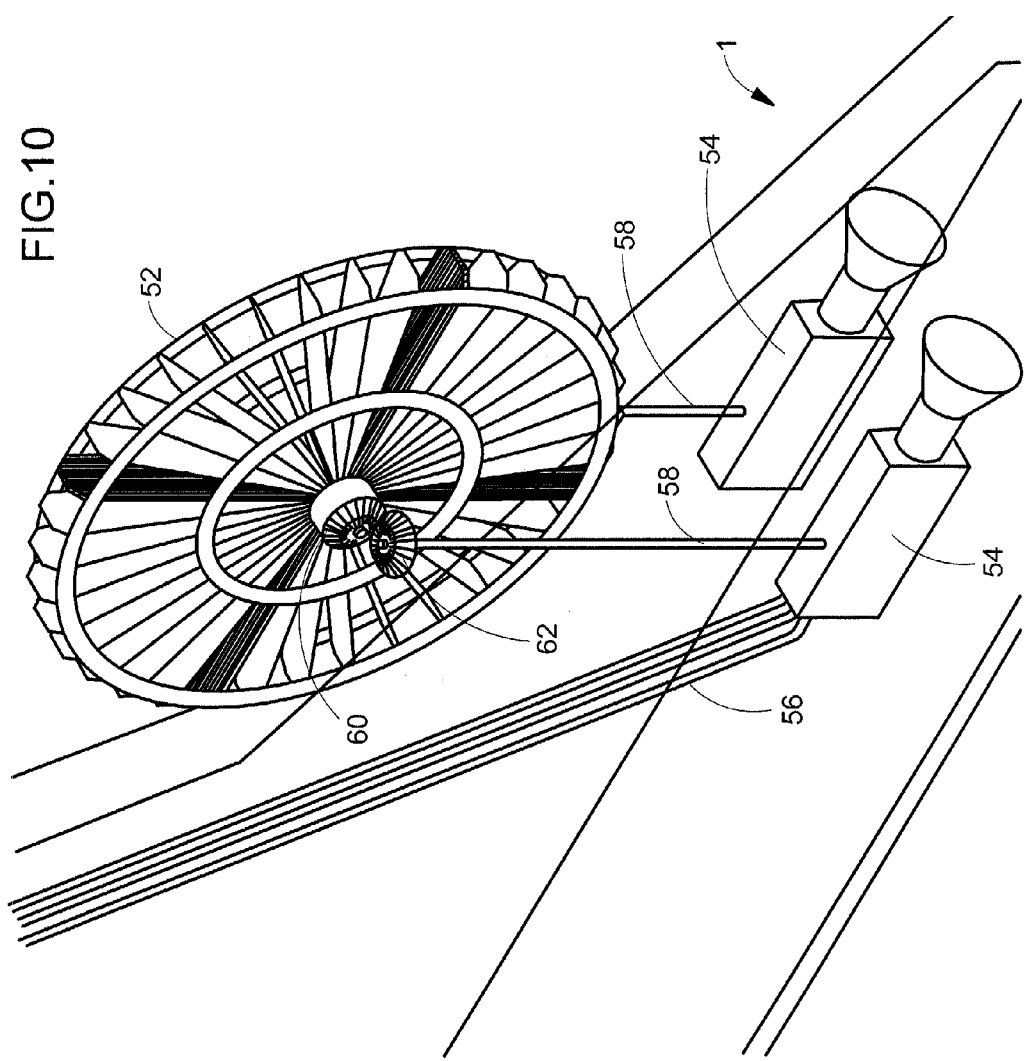
FIG. 10 is an enlarged perspective view of a bottom paddle wheel that powers at least one water pump of a hydroelectric power system in accordance with the present invention.

With reference to FIGS. 9-10, some of the plurality of water pumps may also be driven by a bottom paddle wheel 52. The bottom paddle wheel 52 may also drive at least one water pump 54, which pumps water to the water reservoir 20 through a plurality of inlet pipes 56. The water pumps 54 are preferably driven through a drive shaft 58, a drive gear 60 and a driven gear 62. The paddle tanks 38, 39 in each paddle wheel 10, 52 act as a flywheel and increase the torque of each paddle wheel 10, 52. The individually engagable stators 42 allow the power generation to be varied for a particular application.

Figure 15:
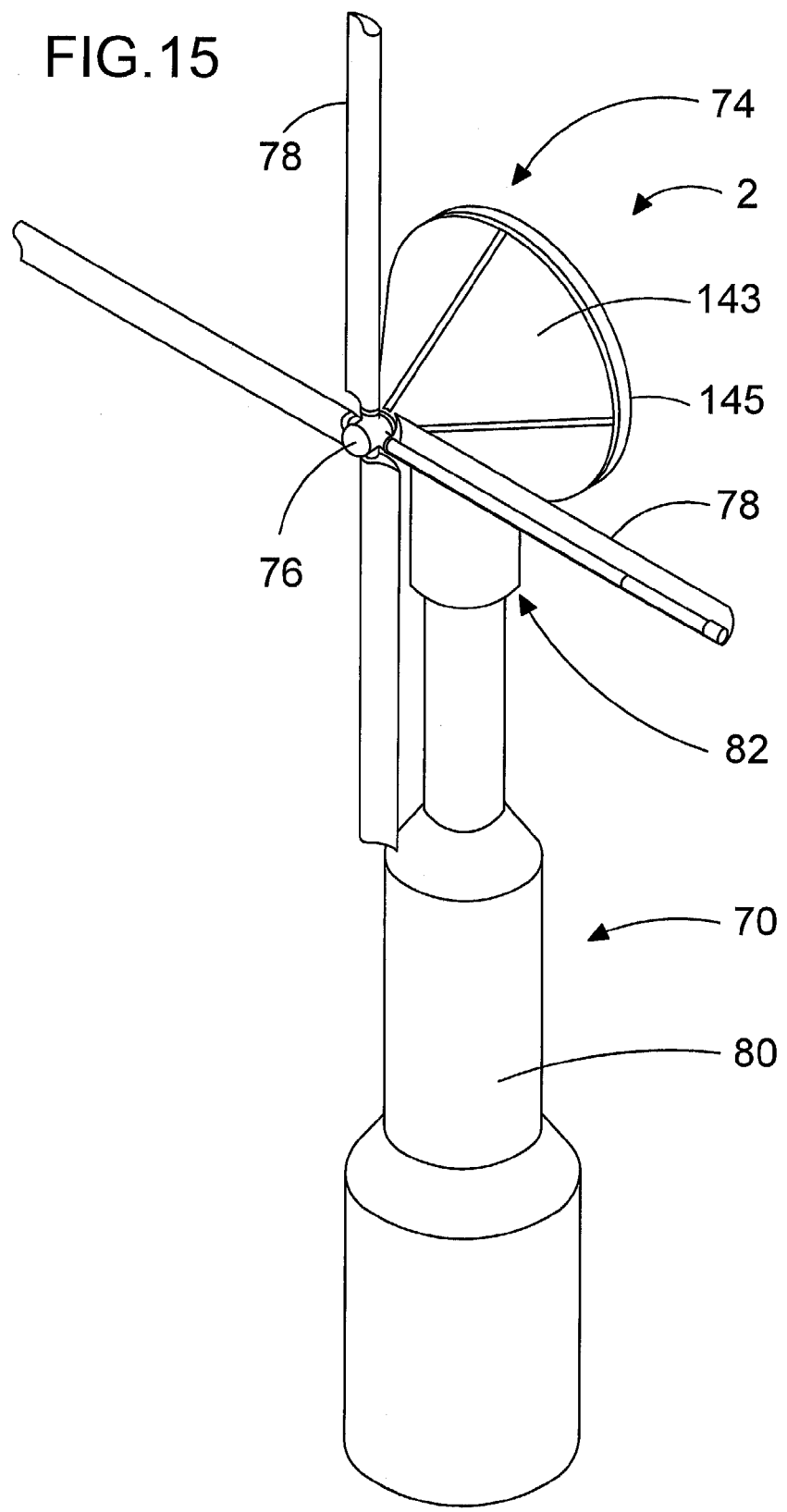
FIG. 15 is a perspective view of a windmill electric generator in accordance with the present invention.
Figure 16:
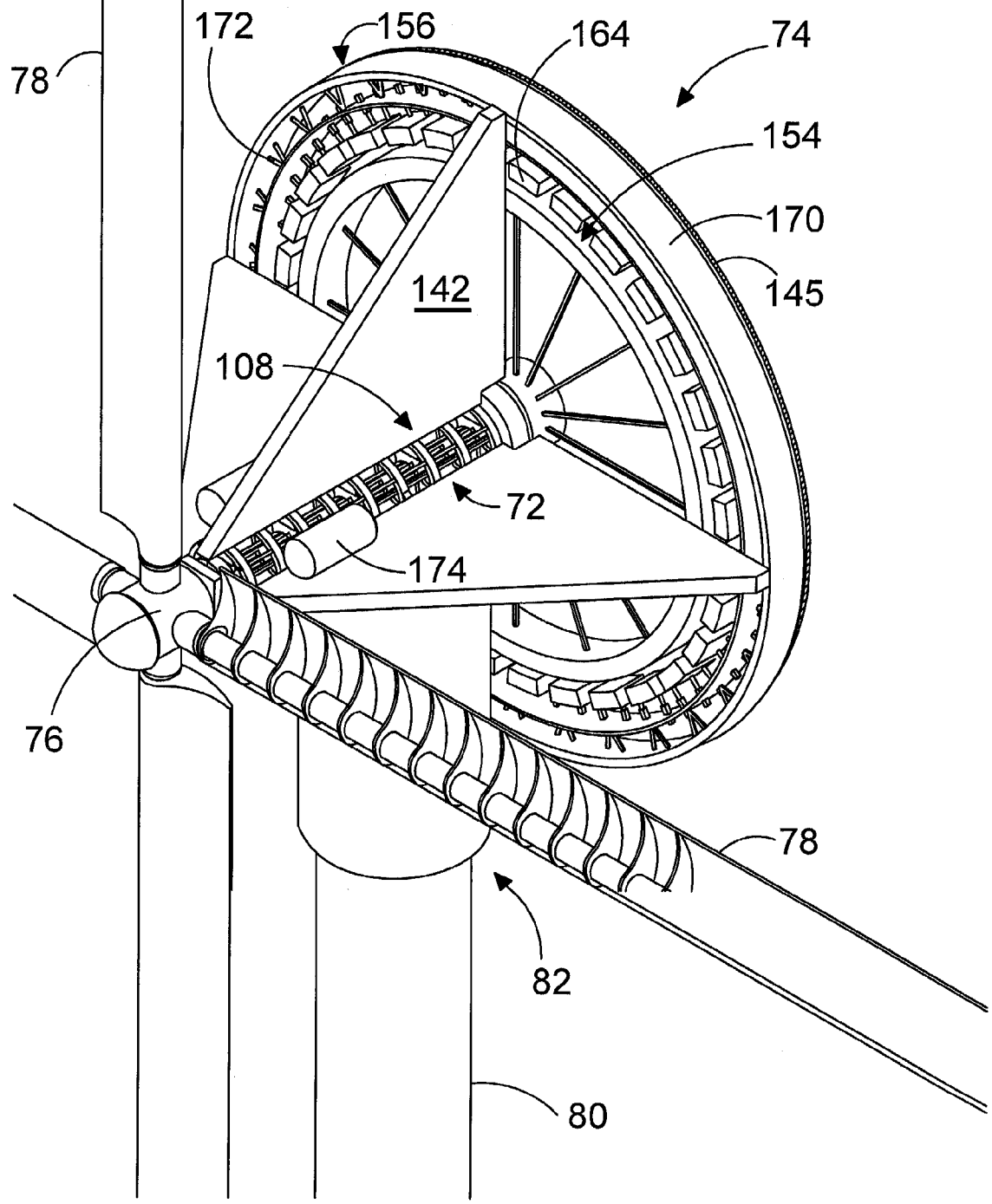
FIG. 16 is an enlarged perspective view of generator covers removed from a generator section of a windmill electric generator in accordance with the present invention.
Figure 17:
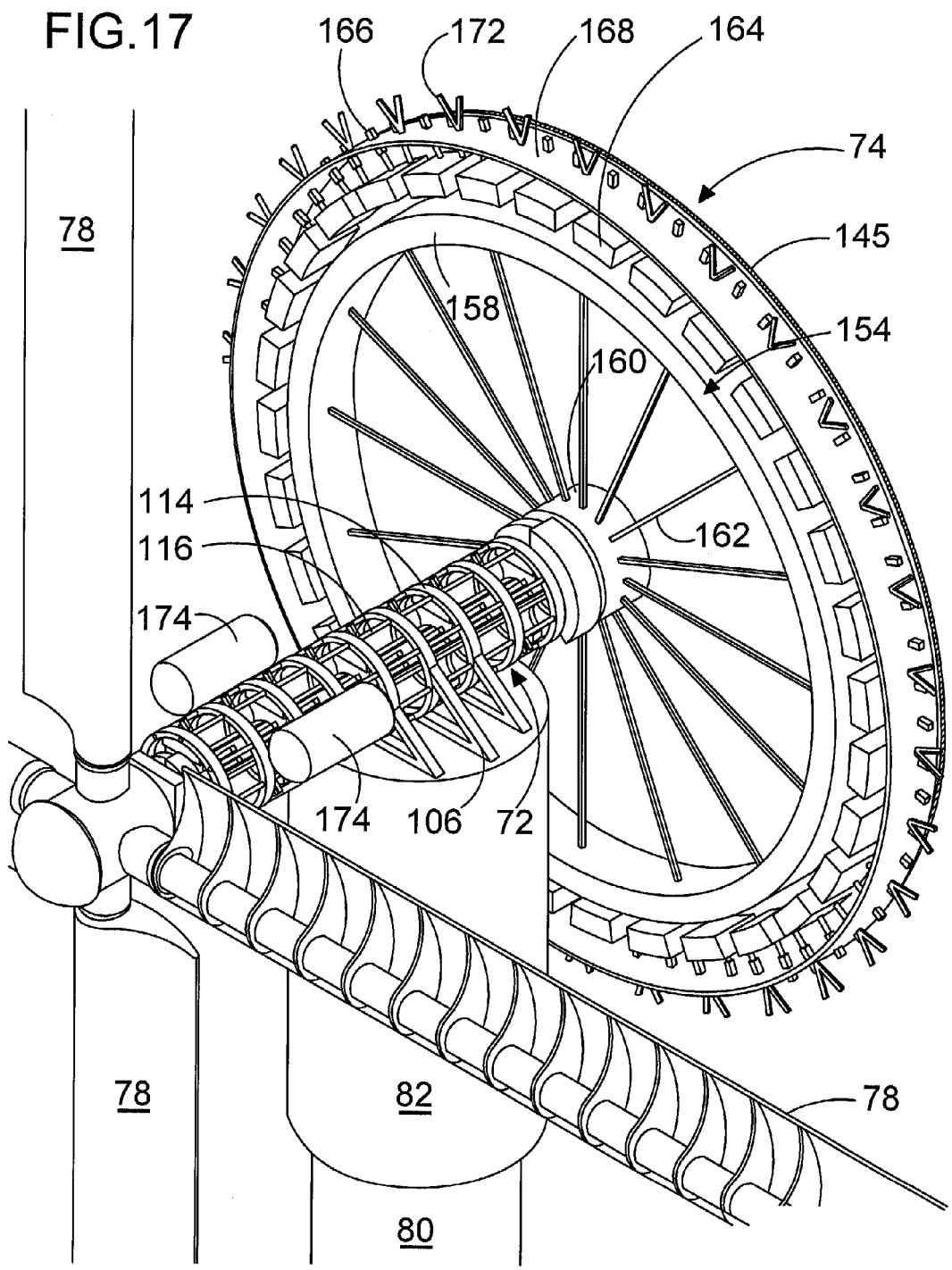
FIG. 17 is an enlarged perspective view of generator covers and large generator support members removed from a generator section of a windmill electric generator in accordance with the present invention.
Figure 18:
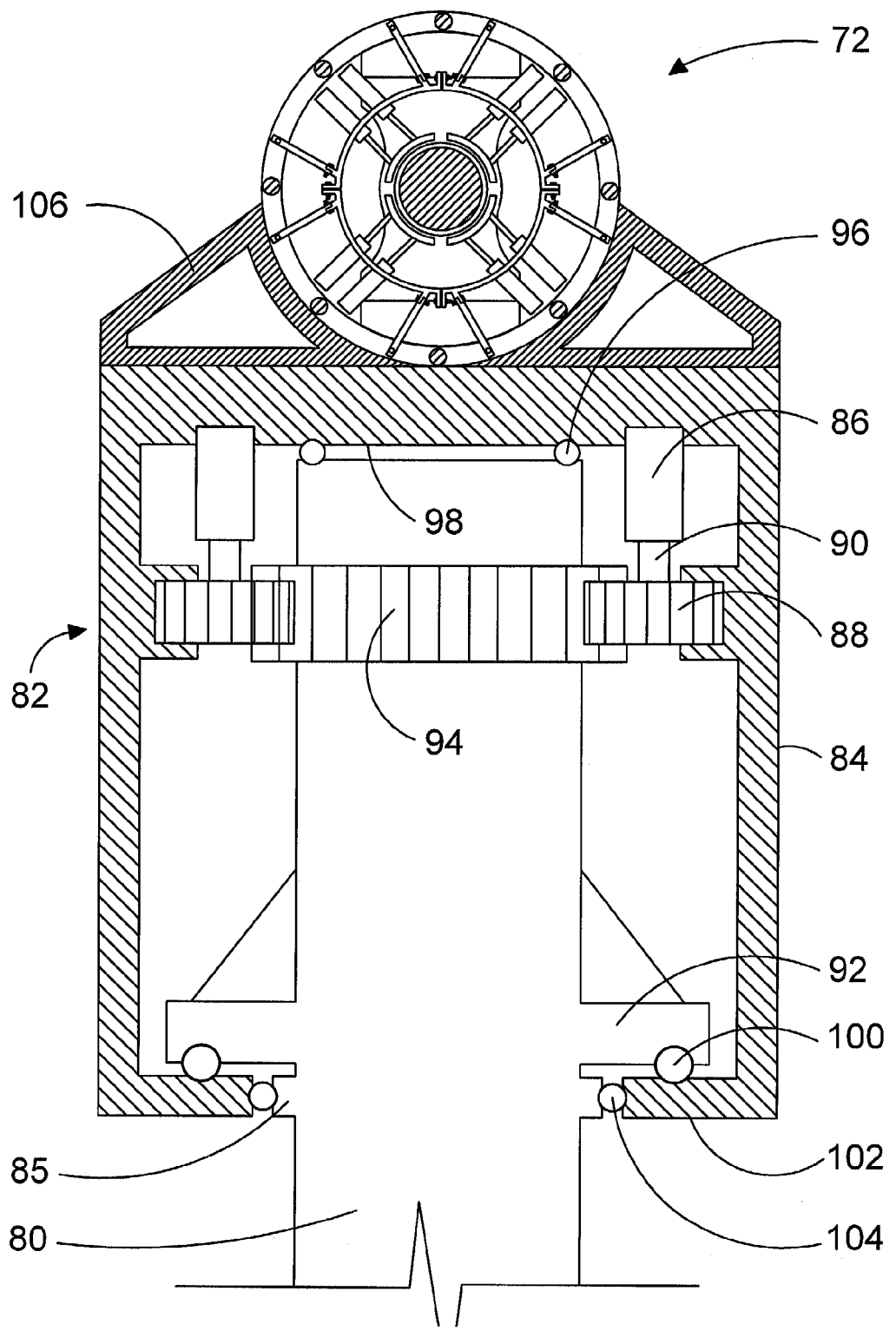
FIG. 18 is a cross sectional view of a rotating support and an inline generator assembly of a windmill electric generator in accordance with the present invention.

With reference to FIGS. 15-17, a windmill electric generator 2 preferably includes a support base 70, an inline generator assembly 72 and a large generator 74, a variable blade pitch housing 76 and a plurality of blades 78. The support base includes a pedestal support 80 and a rotating support 82. With reference to FIG. 18, the rotating support 82 rotates relative to the pedestal support 80. The rotating support 82 includes a rotating housing 84, at least one drive motor 86 and at least one drive gear 88. The at least one drive motor 86 is retained on an inner perimeter of the rotating housing 84. The drive gear 88 extends from a drive shaft 90 of each drive motor 86.

An end of the pedestal support 80 includes a bearing plate 92 and a driven gear 94. A first thrust bearing 96 is retained between an end of the pedestal support 80 and an inside thrust surface 98. A second thrust bearing 100 is retained between a bottom of the bearing plate 92 and a thrust plate 102 attached to a bottom of the rotating housing 84. A rotary bearing 104 is retained between a bearing surface 85 of the pedestal support 80 and an inner diameter of the thrust plate 102. A plurality of generator support brackets 106 are attached on a top of the rotating housing 84. The plurality of generator support brackets 106 are sized to receive the inline generator assembly 72.

With reference to FIGS. 21-24, the inline generator assembly 72 includes a generator support structure 108, a plurality of inline generators 110 and a drive shaft 112. The generator support structure 108 includes a plurality of support rings 114 and a plurality of support rods 116. The plurality of support rings 114 are retained and attached to the plurality of support rods 116 with any suitable method to form the generator support structure 108. Each inline generator 110 includes a tubular rotor 118, a plurality of stator sections 120 and at least two stator retracting frames 122.

Each stator retracting frame 122 is retained between two adjacent support rings 114. Each stator retracting frame 122 preferably includes at least two stator frame sections 124 and a plurality of stator actuators 126. Each stator frame section 124 preferably includes two end flanges 128 and two support flanges 130. Two adjacent stator frame sections 124 are attached to each other by attaching two adjacent end flanges 128 of the two adjacent stator frame sections 124 to each other with a plurality of fasteners 132.

The stator retracting frame 124 is secured between two adjacent support rings 114 with a plurality of stator support members 134. One end of the stator support rod 134 is attached to a single support flange 130 with a stator fastener 136 and the other end is attached to the support ring 114 with a ring fastener 138. The plurality of stator actuators 126 are retained in the stator frame sections 124. An actuating rod 140 of each stator actuator 126 is attached to one of the four stator sections 120. The plurality of stator actuators 126 are capable of retracting the four stator sections 120 from electrical engagement with the tubular rotors 118.

A plurality of large generator support members 142 are attached to the plurality of support rings 114. A plurality of front cover panels 143 are secured to the large generator support members 142 to cover a front of the large generator 74. A rear cover panel 145 is secured to the stator support frame 168 and/or the stator cover ring 170 to cover a rear of the large generator 74. The drive shaft 112 is rotatably supported by a bearing block 144 contained in each support ring 114. The variable blade pitch housing 76 is attached to the one end of the drive shaft 112. Variable blade pitch technology is well known in the art and need not be explained in detail. A first magnetic brake 147 is retained adjacent to the variable blade pitch housing 76 on the one end of the drive shaft 112. A second magnetic brake 149 is retained on the other end of the drive shaft, adjacent the large generator 74. The first and second magnetic brakes are used to decrease the speed of the drive shaft 112 due to high wind conditions.

Figure 19:
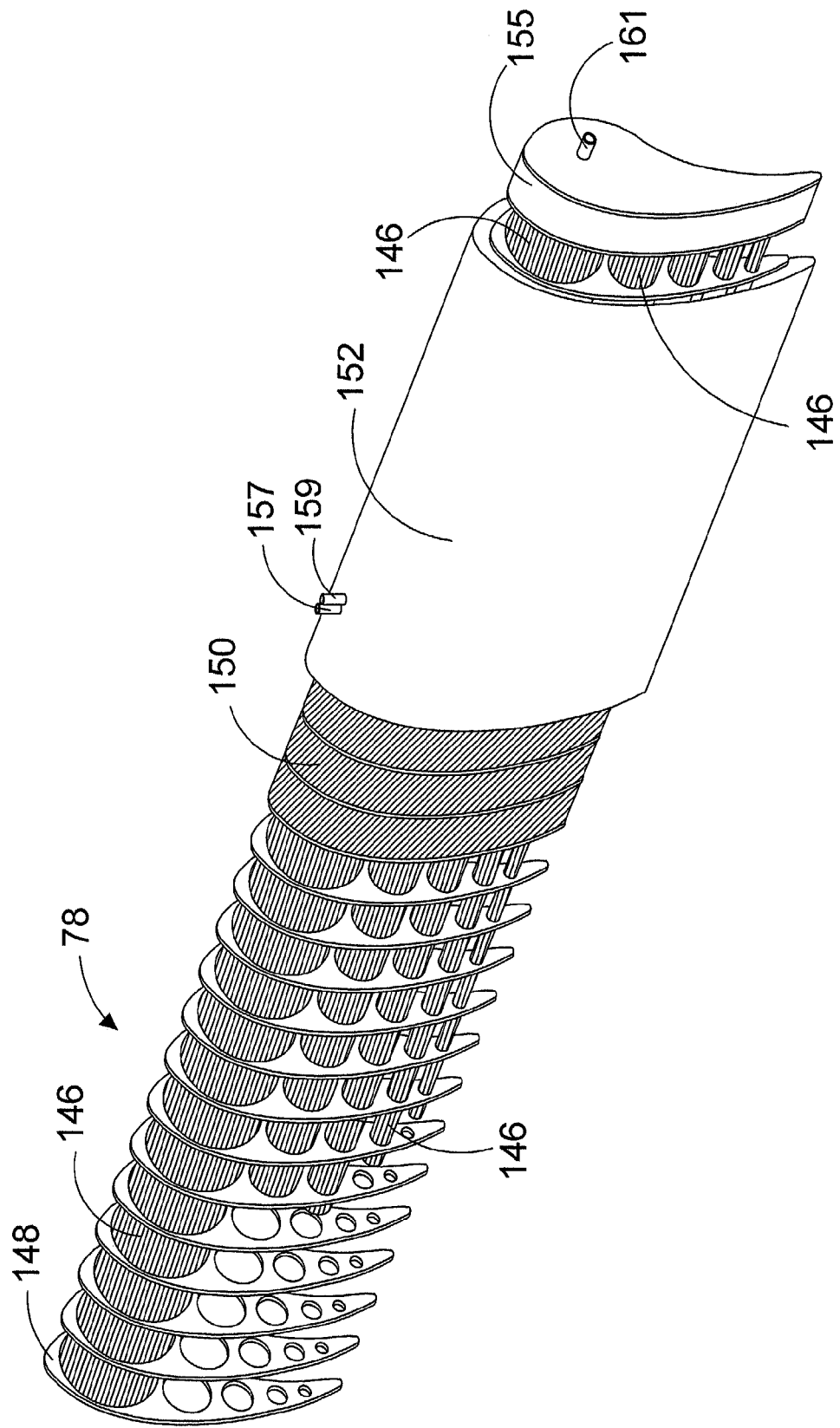
FIG. 19 is a perspective partial cutaway view of a blade of a windmill electric generator in accordance with the present invention.
Figure 20:
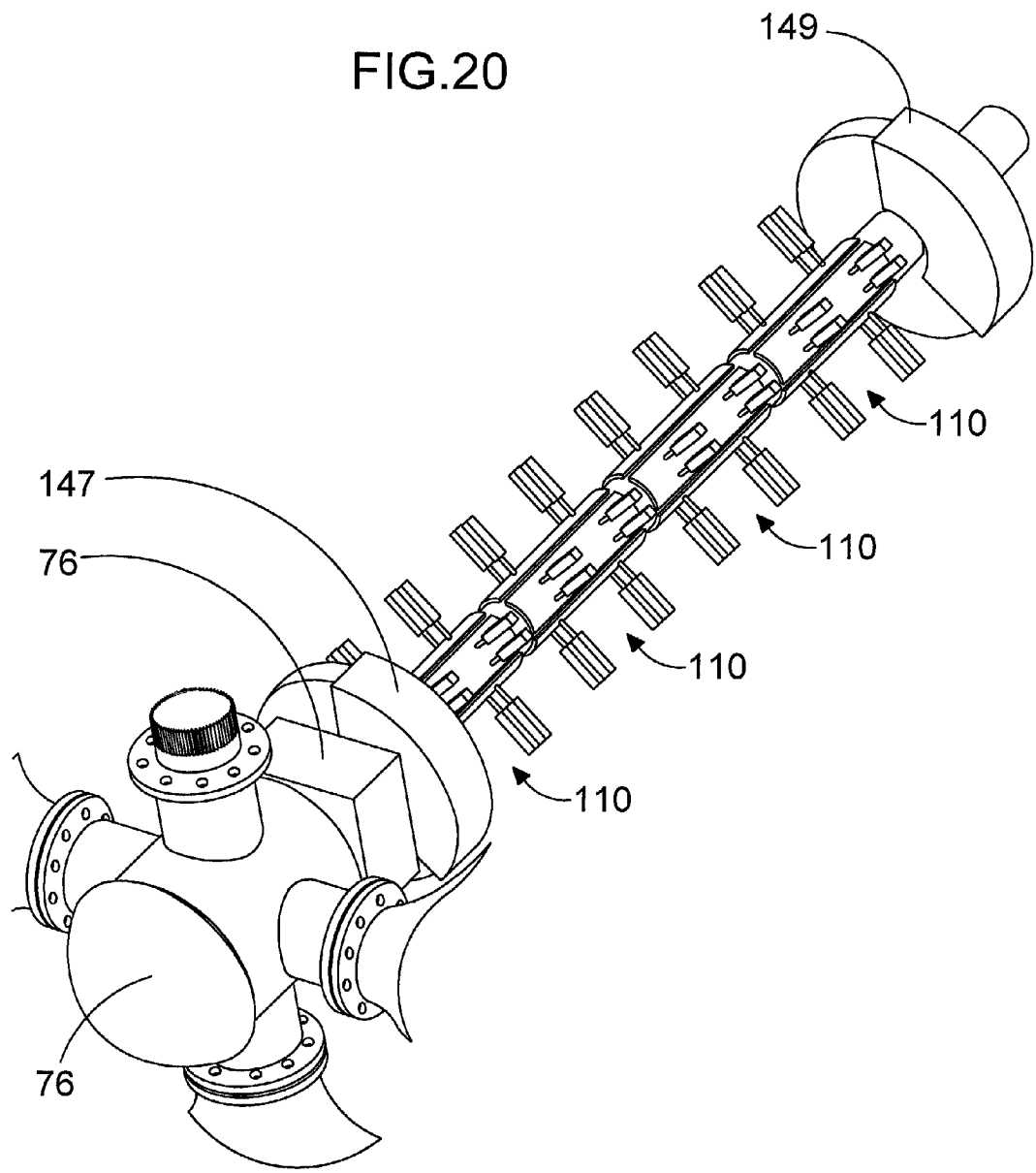
FIG. 20 is a perspective view of an inline generator assembly, a variable blade pitch housing, and two magnetic brakes retained on a drive shaft of a windmill electric generator in accordance with the present invention.
Figure 21:
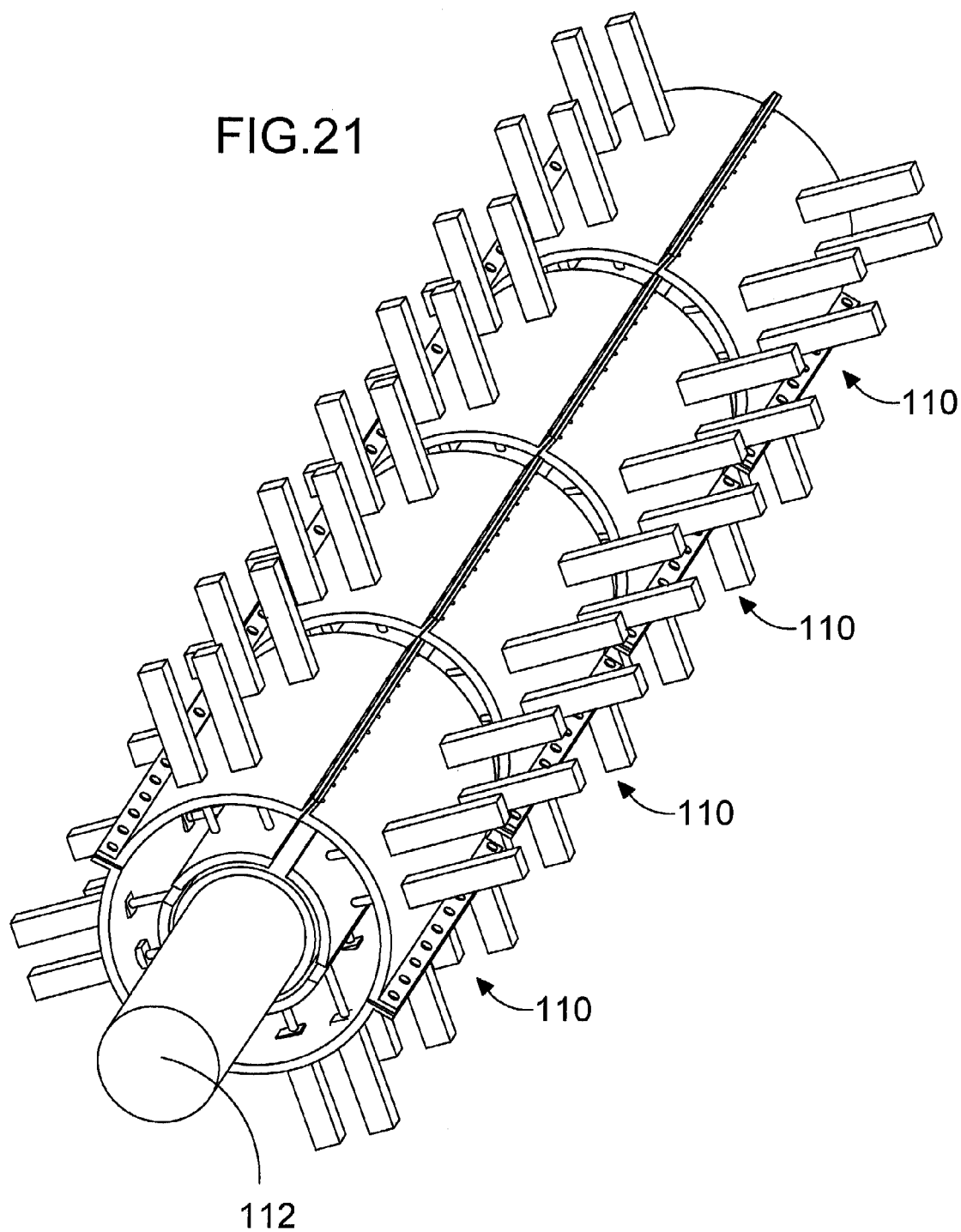
FIG. 21 is a perspective view of a plurality of inline generators retained on a drive shaft of a windmill electric generator in accordance with the present invention.
Figure 22:
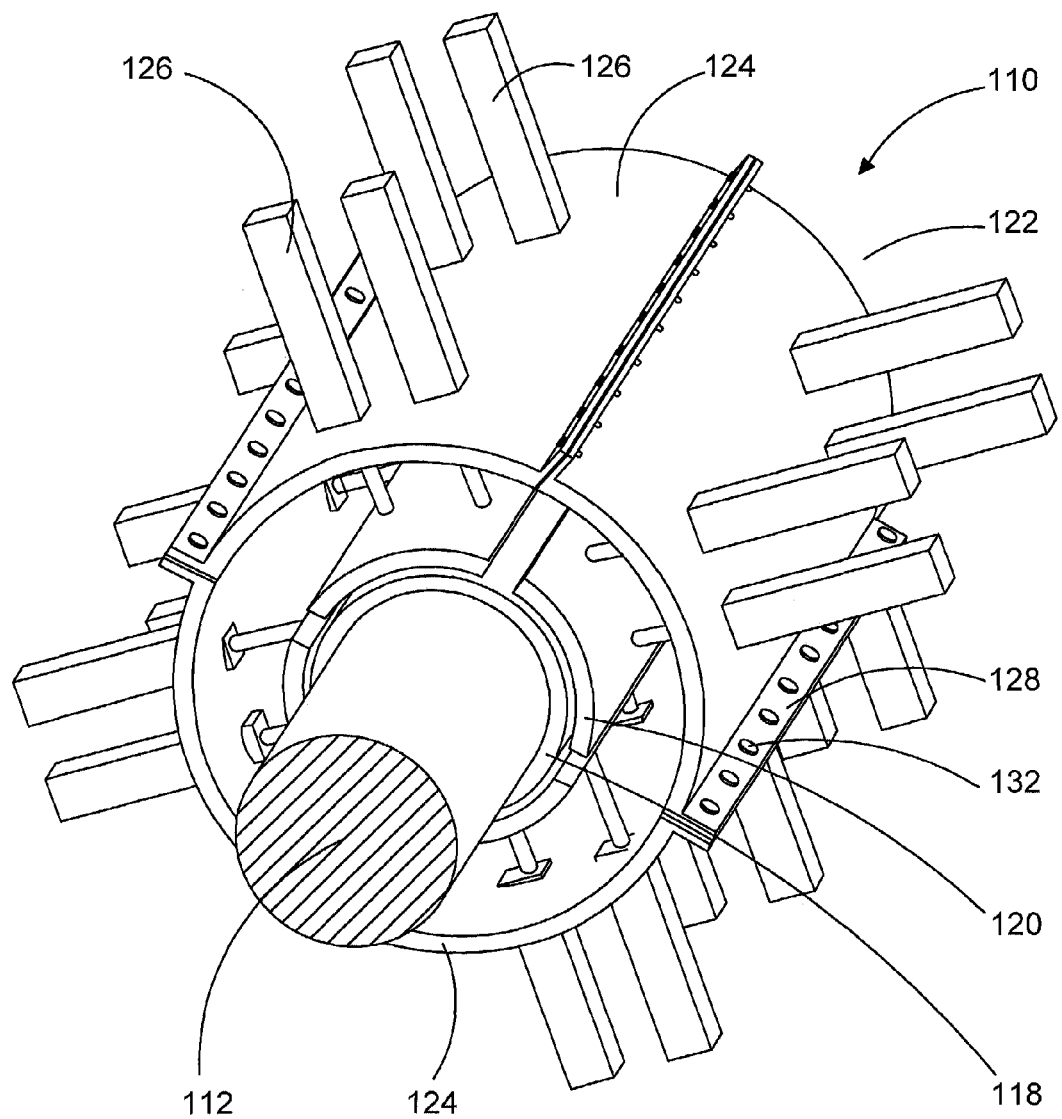
FIG. 22 is an enlarged perspective view of an inline generator retained on a drive shaft of a windmill electric generator in accordance with the present invention.
Figure 23:
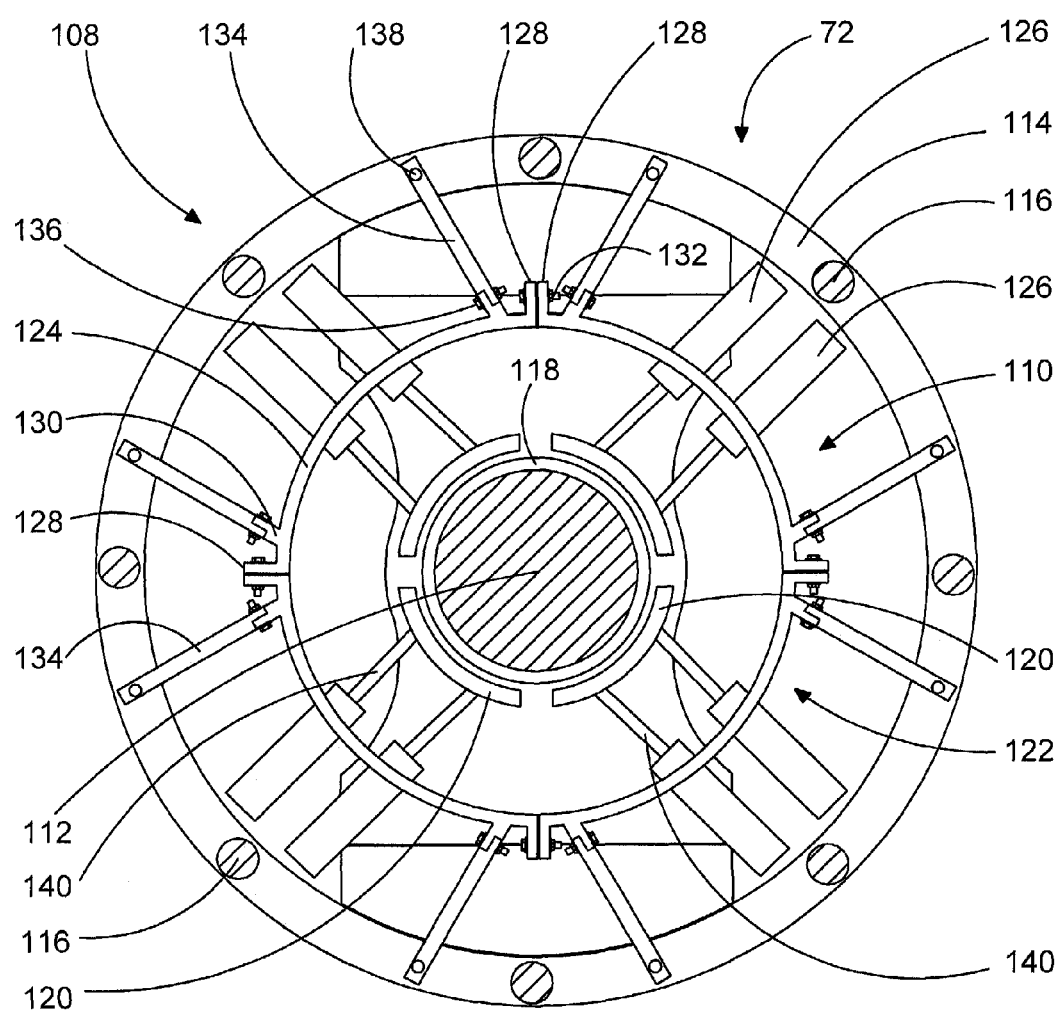
FIG. 23 is an end view of an inline generator assembly of a windmill electric generator in accordance with the present invention.
Figure 24:
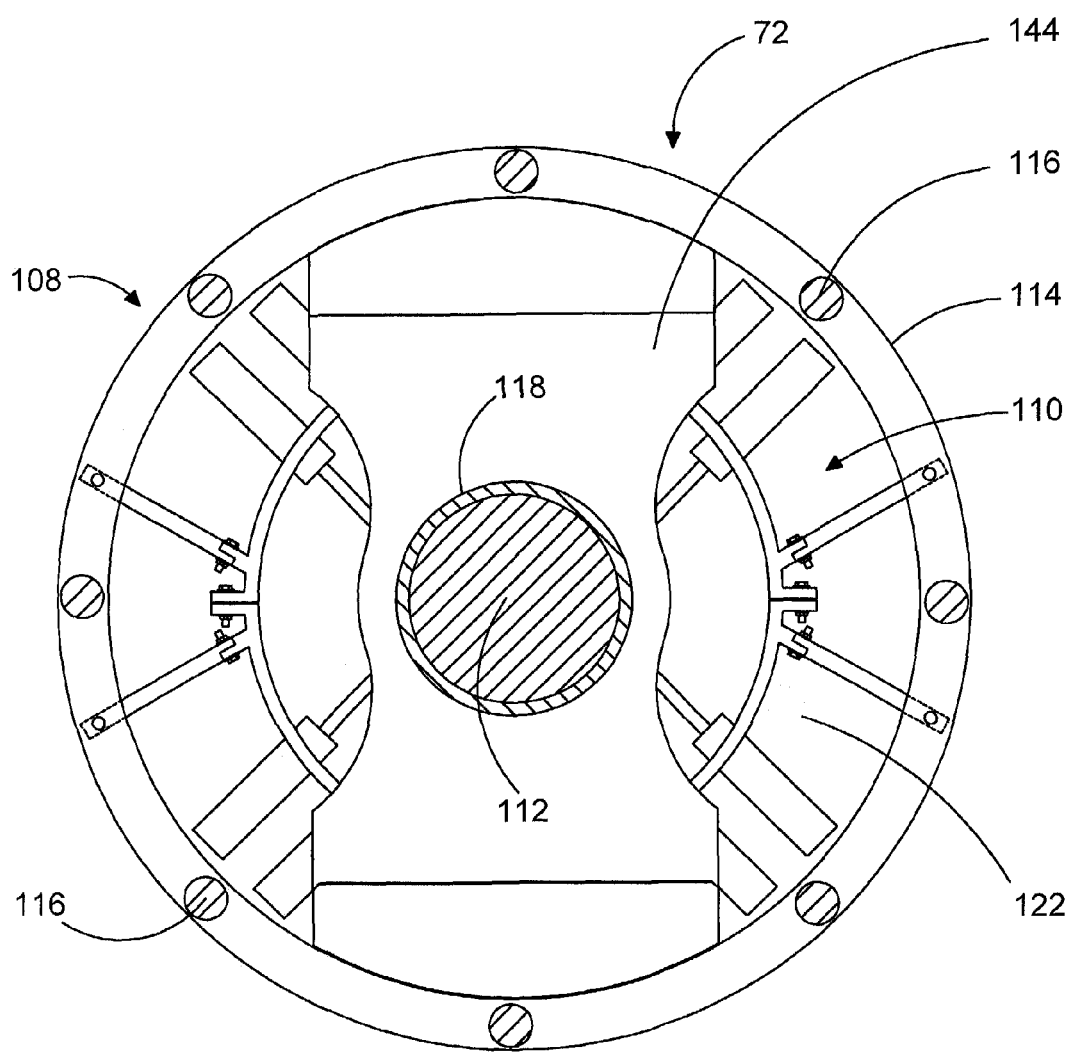
FIG. 24 is an end view of a support ring of an inline generator assembly of a windmill electric generator in accordance with the present invention.

With reference to FIG. 19, each blade 78 is pivotally retained on the variable blade pitch housing 76 relative to a lengthwise axis of the blade 78. Each blade 78 preferably includes a plurality of tubes 146, a plurality of support plates 148, insulating foam 150, a molded skin 152 and an end weight 155. The plurality of tubes 146 are inserted through holes in the plurality of support plates 148 and secured thereto with welding or any other suitable assembly process.

At least one of the largest tubes 146 are preferably partially filled with a fluid, such as water and then filled with compressed air. Filing the at least one tube 146 with fluid is preferably for at least two opposing blades 78. The fluid inside the at least one tube 146 will store potential energy, so as the blades 78 are driven by the wind, fluid movement inside the at least one tube 146 will help the blades 78 reach higher speeds and maintain the higher speeds. The water filling is made through a fill nozzle 157. Preferably, a water overflow tube 159 is also provided. The end weight 155 is disposed at an end of each blade 78. The end weights 155 give the blades 78 a flywheel effect when spinning. A drain plug 161 is preferably located in the end weight 155. The voids between the plurality of support plates 148 are filled with the insulating foam 150. The insulating foam 150 is preferably a closed cell foam. The molded skin 152 is preferably a fiber mat and resin combination formed in a mold, such as fiberglass.

The large generator 74 includes a rotor assembly 154 and a stator assembly 156. The rotor assembly 154 preferably includes a rotor 158, a rotor hub 160 and a plurality of rotor support spokes 162. The rotor hub 160 is retained on the other end of the drive shaft 112. One end of the plurality of rotor support spokes 162 extend from the rotor hub 160 and the rotor 158 is attached to the other end of the plurality of rotor support spokes 162. The stator assembly 156 includes a plurality of stator sections 164, a plurality of stator actuators 166, a stator support frame 168, a stator cover ring 170 and a plurality of stator support spokes 172. The plurality of stator actuators 166 are retained in the stator support frame 168.

The plurality of stator sections 164 extend from actuation rods of the plurality of stator actuators 166. The plurality of stator actuators 166 allow some or all of the plurality of stators sections 164 to be retracted and disengaged from generating electricity. One end of the plurality of stator support spokes 172 are attached to the stator support frame 168 and the other end are attached to the stator cover ring 170. The stator support frame 168 and the stator cover ring 170 are attached to the large generator support members 142. A pair of air tanks 174 are retained adjacent to the generator support structure 108 to supply compressed air to the plurality of stator actuators 126, 166. The large generator 74 eliminates the need for the use of an inefficient gearbox to speed up the generator. The outside perimeter of the large generator 74 will have a velocity closer to that of a tip of the blades 78.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A windmill electric generator comprising:
   a support base;
   a drive shaft;
   an inline generator including a generator support structure, a plurality of tubular rotors, a plurality of inline stator sections and a plurality of stator retracting frames, said generator support structure being retained by said support base, said generator support structure rotatably retaining said drive shaft, said plurality of tubular rotors being retained on said drive shaft, said plurality of stator retracting frames being retained by said generator support structure, said plurality of inline stator sections being retractable relative to said plurality of retracting frames;
   a plurality of blades; and
   a blade housing being retained on one end of said drive shaft, one end of said plurality of blades being retained by said blade housing, rotation of said blade housing causing electricity to be generated by said inline generator.

2. The windmill electric generator of claim 1, further comprising:
   a generator including a rotor and a stator assembly, said rotor being retained on the other end of said drive shaft, said stator assembly including a plurality of stator sections, a stator support frame, said stator support frame being retained by said support base, said plurality of stator sections being retractable relative to said stator support frame.

3. The windmill electric generator of claim 2, further comprising:
   a plurality of actuators being retained in said stator support frame for the retraction of said plurality of stator sections.

4. The windmill electric generator of claim 1, further comprising:
   each one of said plurality of blades including a plurality of tubes and a plurality of support plates said plurality of support plates being retained on said plurality of tubes, at least two opposing blades of said plurality of blades having at least one tube of said plurality of tubes partially filled with a fluid.

5. The windmill electric generator of claim 1, further comprising:
   an end weight being placed on the other end of each one of said plurality of blades.

6. The windmill electric generator of claim 4, further comprising:
   said blade housing being a variable blade pitch housing, said plurality of blades pivoting along a lengthwise axis relative to said variable blade pitch housing.

7. The windmill electric generator of claim 1, further comprising:
   said support base including a pedestal support and a rotating support, said rotating support rotating relative to said pedestal support, said generator support structure being retained on said rotating support.

8. The windmill electric generator of claim 1, further comprising:
   a plurality of actuators being retained in said stator support frame for the retraction of said plurality of inline stator sections.

9. A windmill electric generator comprising:
   a support base;
   a drive shaft being pivotally supported relative to said support base;
   a generator including a rotor and a stator assembly, said rotor being retained on the other end of said drive shaft, said stator assembly including a plurality of stator sections, a stator support frame, said stator support frame being retained by said support base, said plurality of stator sections being retractable relative to said stator support frame;
   a plurality of blades; and
   a blade housing being retained on one end of said drive shaft, one end of said plurality of blades being retained by said blade housing, rotation of said blade housing causing electricity to be generated by said inline generator.

10. The windmill electric generator of claim 9, further comprising:
    an inline generator including a generator support structure, a plurality of tubular rotors, a plurality of inline stator sections and a plurality of stator retracting frames, said generator support structure being retained by said support base, said generator support structure rotatably retaining said drive shaft, said plurality of tubular rotors being retained on said drive shaft, said plurality of stator retracting frames being retained by said generator support structure, said plurality of inline stator sections being retractable relative to said plurality of retracting frames.

11. The windmill electric generator of claim 9, further comprising:
    each one of said plurality of blades including a plurality of tubes and a plurality of support plates said plurality of support plates being retained on said plurality of tubes, at least two of said plurality of blades having at least one tube of said plurality of tubes partially filled with a fluid.

12. The windmill electric generator of claim 11, further comprising:
    an end weight being placed on the other end of each one of said plurality of blades.

13. The windmill electric generator of claim 11, further comprising:
    said blade housing being a variable blade pitch housing, said plurality of blades pivoting along a lengthwise axis relative to said variable blade pitch housing.

14. The windmill electric generator of claim 10, further comprising:
said support base including a pedestal support and a rotating support, said rotating support rotating relative to said pedestal support, said generator support structure being retained on said rotating support.

15. A windmill electric generator comprising:
a support base;
a drive shaft being pivotally supported relative to said support base;
at least one electric generator being rotated by said drive shaft;
a plurality of blades, each one of said plurality of blades including a plurality of tubes and a plurality of support plates said plurality of support plates being retained on said plurality of tubes, at least two of said plurality of blades having at least one tube of said plurality of tubes partially filled with a fluid,
a blade housing being retained on one end of said drive shaft, one end of said plurality of blades being retained by said blade housing, rotation of said blade housing causing electricity to be generated by said inline generator; and
said at least one generator including a rotor and a stator assembly, said rotor being retained on the other end of said drive shaft, said stator assembly including a plurality of stator sections, a stator support frame, said stator support frame being retained by said support base, said plurality of stator sections being retractable relative to said stator support frame.

16. The windmill electric generator of claim 15, further comprising:
an inline generator including a generator support structure, a plurality of tubular rotors, a plurality of inline stator sections and a plurality of stator retracting frames, said generator support structure being retained by said support base, said generator support structure rotatably retaining said drive shaft, said plurality of tubular rotors being retained on said drive shaft, said plurality of stator retracting frames being retained by said generator support structure, said plurality of inline stator sections being retractable relative to said plurality of retracting frames.

17. The windmill electric generator of claim 15, further comprising:
an end weight being placed on the other end of each one of said plurality of blades.

18. The windmill electric generator of claim 15, further comprising:
said blade housing being a variable blade pitch housing, said plurality of blades pivoting along a lengthwise axis relative to said variable blade pitch housing.

19. The windmill electric generator of claim 15, further comprising:
said support base including a pedestal support and a rotating support, said rotating support rotating relative to said pedestal support, said generator support structure being retained on said rotating support.

* * * * *